US009469028B2

(12) United States Patent
Sisbot et al.

(10) Patent No.: US 9,469,028 B2
(45) Date of Patent: Oct. 18, 2016

(54) ROBOTIC HANDOVER SYSTEM NATURAL FOR HUMANS

(71) Applicant: TOYOTA JIDOSHA KABUSHIKI KAISHA, Toyota-shi, Aichi-ken (JP)

(72) Inventors: Emrah Akin Sisbot, Mountain View, CA (US); Halit Bener Suay, Worcester, MA (US); Yutaka Takaoka, Toyota (JP); Yusuke Nakano, Toyota (JP)

( * ) Notice: Subject to any disclaimer, the term of this patent is extended or adjusted under 35 U.S.C. 154(b) by 121 days.

(21) Appl. No.: 14/502,951

(22) Filed: Sep. 30, 2014

(65) Prior Publication Data
US 2016/0089782 A1    Mar. 31, 2016

(51) Int. Cl.
*G05B 19/04* (2006.01)
*G05B 19/18* (2006.01)
*B25J 9/16* (2006.01)

(52) U.S. Cl.
CPC ..................... *B25J 9/163* (2013.01)

(58) Field of Classification Search
CPC ...... B25J 9/163; B25J 9/1633; B25J 9/0003; B25J 11/008; B25J 11/009
USPC ................ 700/245, 246, 250, 257, 258, 259
See application file for complete search history.

(56) References Cited

U.S. PATENT DOCUMENTS

2013/0245822 A1\* 9/2013 Kawanami ............. B25J 9/1669
700/245

FOREIGN PATENT DOCUMENTS

WO    2014048444 A1    4/2014

OTHER PUBLICATIONS

Sisbot et al, A Human-Aware Manipulation Planner, 2012 IEEE Transactions on Robotics, vol. 28, No. 5, Oct. 2012, pp. 1045-1057.\*
Strabala et al, Toward Seamless Human-Robot Handovers, 2013,Journal of Human-Robot Interaction, vol. 2, No. 1, 2013, pp. 112-132. DOI 10.5898/JHRI.2.1, pp. 112-132.\*
Huang et al, Adaptive Coordination Strategies for Human-Robot Handovers, Jul. 2015, Proceedings of Robotics: Science and Systems, Rome, Italy, pp. 1-10.\*
Sisbot et al, Supervision and motion planning for a mobile manipulator interacting with humans, 2008, HRI'08, Mar. 12-15, 2008, Amsterdam, The Netherlands, pp. 1-8.\*

(Continued)

*Primary Examiner* — Jaime Figueroa
(74) *Attorney, Agent, or Firm* — Burbage Law, P.C.; Elizabeth Ruzich; Jon-Michael Burbage

(57) ABSTRACT

The disclosure includes a system and method for determining posture data for a user based on observation of the user, generating user model data describing one or more user models, determining user preferences data describing the preferences of the user for receiving an object, generating two or more reach simulations that simulate the user reaching for different points inside a user environment to receive the object, each reach simulation resulting in a hand of the user arriving at a three-dimensional point in the user environment, analyzing the reach simulations to assign a value to each three-dimensional point in the user environment, grouping the three-dimensional points into one or more clusters of similar points to form candidate zones including one or more points inside the user environment where a robot can place the object for handover to the user, and ranking the candidate zones.

20 Claims, 14 Drawing Sheets

(56) References Cited

OTHER PUBLICATIONS

Hashimoto et al, A Field Study of the Human Support Robot in the Home Environment, 2013 IEEE Workshop on Advanced Robotics and its Social Impacts (ARSO) Shibaura Institute of Technology, Tokyo, Japan, Nov. 7-9, 2013, pp. 143-150.*

Sisbot et al, Spatial reasoning for human robot interaction, Proceedings of the 2007 IEEE/RSJ International Conference on Intelligent Robots and Systems, San Diego, CA, USA, Oct. 29-Nov. 2, 2007, pp. 2281-2287.*

Chan, W.P., Parker, C.A.C., Van der Loos, H.F.M., and Croft, E.A., "A human-inspired object handover controller," Int. J. Rob. Res., vol. 32, No. 8, Jul. 2013, pp. 971-983.

Mainprice, J., Sisbot, E. Akin, Jaillet, L., Cortes, J., Alami, R., and Simeon, T., "Planning human-aware motions using a sampling-based costmap planner," in 2011 IEEE International Conference on Robotics and Automation, 2011, pp. 5012-5017.

Aleotti, J., Micelli, V., and Caselli, S., "Comfortable robot to human object hand-over," in 2012 IEEE RO-MAN: The 21st IEEE International Symposium on Robot and Human Interactive Communication, 2012, pp. 771-776.

Kulić, D. and Croft, E., "Pre-collision safety strategies for human-robot interaction," Auton. Robots, vol. 22, No. 2, Oct. 2006, pp. 149-164.

King, C.H., Chen, T.L., Fan, Z., Glass, J.D., and Kemp, C.C., "Dusty: an assistive mobile manipulator that retrieves dropped objects for people with motor impairments.," Disabil. Rehabil. Assist. Technol., vol. 7, No. 2, Mar. 2012, pp. 168-179.

Cakmak, M., Srinivasa, S., Lee, M.K., Forlizzi, J., and Kiesler, S., "Human Preferences for Robot-Human Hand-over Configurations," in IEEE/RSJ International Conference on Intelligent Robots and Systems, 2011, 8 pgs.

Chaffin, D. and Erig, M., "Three-dimensional biomechanical static strength prediction model sensitivity to postural and anthropometric inaccuracies," IIE Trans., 1991, pp. 215-227.

Fraunhofer Institute for Manufacturing Engineering and Automation IPA, Care-o-bot 3, Fraunhofer IPA, Jan. 2013, 2 pgs.

Honda Motor Corp., Ltd., ASIMO, Frequently Asked Questions, Sep. 2007, 6 pgs.

* cited by examiner

ROBOTIC HANDOVER SYSTEM NATURAL FOR HUMANS

INCORPORATION BY REFERENCE

The entirety of U.S. patent application Ser. No. 14/485,526, filed Sep. 12, 2014 and entitled "ANTICIPATORY ROBOT NAVIGATION" is herein incorporated by reference.

BACKGROUND

The specification relates to using a robot to handover objects.

Service robots are becoming increasing popular. These robots may provide assistance to the elderly or people with medical conditions. Service robots perform numerous tasks. For example, a service robot may be expected to handover objects to a user. However, the methods that robots use for object pick-and-place in static environments are slow and inefficient when used for robot-human handover.

SUMMARY

According to one innovative aspect of the subject matter described in this disclosure, a method for determining candidate zones for a robot to handover an object to a user is described. One or more steps of the method may be executed by a processor programmed to execute that step. The method may include determining posture data for a user based on observation of the user. The posture data may describe the posture of the user when reaching for one or more locations. The method may include generating user model data describing one or more user models based on the posture data and user data describing the height and weight for the user. The method may include determining user preferences data describing the preferences of the user for receiving an object. The method may include generating two or more reach simulations that simulate the user reaching for different points inside a user environment to receive the object, each reach simulation resulting in a hand of the user arriving at a three-dimensional point in the user environment and moments being applied to the joints of the user. The method may include analyzing the reach simulations to assign a value to each three-dimensional point in the user environment, each value being based on the moments applied to the joints of the user when reaching to that three-dimensional point and whether the three-dimensional point is consistent with the user preferences for receiving the object. The method may include grouping the three-dimensional points into one or more clusters of similar points to form candidate zones including one or more points inside the user environment where a robot can place the object for handover to the user. The method may include ranking the candidate zones based on the values and storing the ranked candidate zones are zone data.

According to another innovative aspect of the subject matter described in this disclosure, a method for determining an object transfer pose for handover of an object to a user is described. One or more steps of the method may be executed by a processor programmed to execute that step. The method may include determining assessment criteria data based on sensor data. The method may include filtering a list of candidate zones based on the assessment criteria data to determine an object transfer pose describing how a robot is oriented for handover of an object to a user, the candidate zones including one or more points inside a user environment where the robot can place the object for handover to the user. The method may include determining a user action after taking the object from the robot. The method may include determining whether to handover the object to the user based on the user action. The method may include, responsive to determining to handover the object to the user, beginning actuation of the robot to handover the object to the user based on the object transfer pose.

Other aspects include a processor and a tangible, non-transitory memory storing instructions for performing one or more of these methods when executed by the processor.

Throughout the disclosure, the term "data" may be used to represent any digital data undergoing the transfer functions or operations described herein. The digital data may include, but is not limited to, network services data, connectivity map data, journey data, user profile data, time synchronicity data, historical journey data, preference hierarchy data, dead zone data, navigation map data, mesh network data, velocity data, data to be shared between two or more entities (e.g., servers, vehicle systems, mobile client devices, client devices, etc.) and data to be transferred between two or more entities.

The disclosure is particularly advantageous in a number of respects. For example, the robot may handover an object to the user while considering the preferences of the user or medical input providers. The handover of the object to the user may be based on one or more user models that are specific to the user. For example, the user model may be based on the height and weight of the user to simulate three-dimensional, asymmetric moments and force distribution on the joints of the user when the user is reaching to receive the object from the robot.

The advantages of the system described herein are provided by way of example, and the system may have numerous other advantages.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

System Overview

In order to perform a successful handover, a robot may be programmed to explicitly consider the preferences, body types, and body limitations of users. For example, assume a robot has the task of handing a bottle of water to a user. The robot may be programmed to determine and consider how much effort the user would spend to take the bottle of water from the robot's possession. In such a scenario, the robot may be programmed to determine the best position that would find a balance between the minimization of the effort applied by the user, and the time to perform the handover task for the robot. If the user has a particular health condition such as joint range of motion limitations—for example due to injury, muscle stiffness, muscle strength loss in some joints, tremors in some limbs etc.—the robot may be programmed to (1) determine the existence of these health conditions and (2) consider these health conditions to determine the best position to reach the object for the user to grasp. The robot may also be programmed to determine whether direct handover will be attempted based on a medical condition or currently observed situation or physical situation of the user. If a handover determined to be too risky or not possible, then the robot may be programmed to place the bottle of water on a nearby surface that is still reachable by the user.

Systems and methods for determining object transfer poses for a robot to handover an object to a user may be described. In one embodiment, the robot is programmed to determine an object transfer pose based in part on: (1) biomechanical properties of a user (including, for example, the physical or medical conditions of the user); (2) the surrounding environment of the user; and (3) the motions of the user after grasping for the object. The robot may be programmed to determine the motions of the user after taking or grasping for the object. In one embodiment, the robot may receive an explicit input describing the motions of the user after taking or grasping for the object.

The preferences of the user may be determined based on an explicit input of the user or a determined inference of the user's preferences based on data collected by sensors or medical input providers such as doctors, nurses or caregivers. In one embodiment, the transfer of objects to a user is improved by receiving and considering data from medical input providers.

Figure 1:
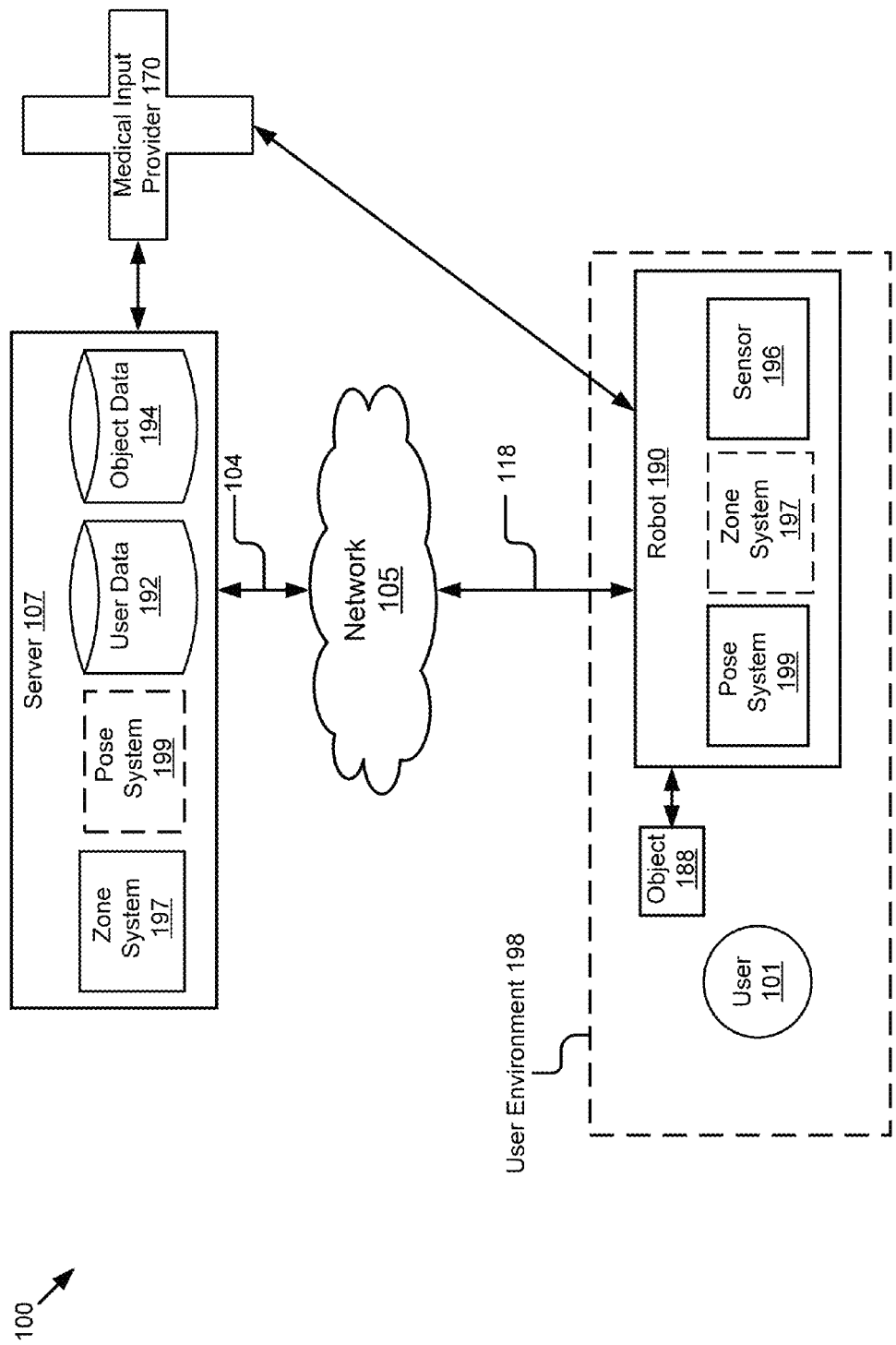
FIG. 1 is a block diagram illustrating an example system for using a robot to handover an object to a user.

FIG. 1 illustrates a block diagram of some embodiments of a system 100 for using a robot 190 to handover an object 188 to a user 101. The system 100 includes a server 107 communicatively coupled to a network 105 via signal line 104, a robot 190 communicatively coupled to the network 105 via signal line 118, a user 101 and a medical input provider 170.

While FIG. 1 illustrates one user 101, one server 107, one robot 190, one object 188 and one medical input provider 170, the disclosure applies to a system architecture including one or more users 101, one or more servers 107, one or more robots 190, one or more objects 188 or one or more medical input providers 170. Furthermore, although FIG. 1 illustrates one network 105 coupled to the entities of the system 100, in practice one or more networks 105 of various types may be connected to these entities.

The network 105 can be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, WAP, e-mail, etc. In some embodiments, the network 105 may include a GPS satellite for providing GPS navigation to the robot 190. The network 105 may be a mobile data network, for example, 3G, 4G, LTE, Voice-over-LTE ("VoLTE") or any other mobile data network or combination of mobile data networks. In some embodiments, the network 105 may be a combination of different networks.

The user 101 may be a human user of the robot. In one embodiment, the user 101 may be an elderly person or a person with a medical condition that may benefit from assistance of the robot 190. The object 188 is any tangible object. The robot 190 may assist the user 101 by handover of the object 188 to the user 101.

The robot 190 may handover the object 188 to the user 101 within a user environment 198. The user environment 198 may be the area around the user 101 as well as the objects in the area. For example, the user environment 198 is a room and all the objects in the room such as a table, chair, magazine or other tangible objects located in the area forming the user environment 198.

The robot 190 may be a processor-based device programmed to perform one or more of the methods described below. For example, the robot may be programmed to perform some or all of the methods described below with reference to FIG. 3 or 5. The robot 190 may include a motor and controller for actuating movements based on a program stored on a tangible memory of the robot 190 and executed by a processor of the robot 190. The robot 190 may be programmed to handover the object 188 to the user 101. In one embodiment, the robot 190 may be a special purpose processor-based device programmed to perform one or more steps of the methods 300, 400, 500 described below with reference to FIGS. 3, 4 and 5.

In one embodiment, the robot 190 may be a computing device that includes a tangible or non-transitory memory and a processor. For example, the robot 190 may be a laptop computer, a desktop computer, a tablet computer, a mobile telephone, a personal digital assistant ("PDA"), a mobile e-mail device, a portable game player, a portable music player, a connected device or wearable computer (e.g., a smart watch, smart glasses, fitness tracker, etc.), a television with one or more processors embedded therein or coupled thereto, a vehicle, or other electronic device capable of accessing the network 105. In one embodiment, the robot 190 may be an autonomous vehicle or a semi-autonomous vehicle.

The robot 190 may include functionality to enable a user to consume network services. The network services may include any service accessible via the network 105. For example, the network services include navigation instructions, streaming audio or video (such as Pandora™, Spotify™, iTunes™, Google Play™, YouTube™, etc.), social networking (such as Facebook™, Google+™, LinkedIn™, Tinder™, QQ™, etc.), microblogging (such as Twitter™, Tumblr™, etc.), online chatting (such as SnapChat™, WhatsApp™, etc.), online content sharing (such as Instagram™, Pinterest™, etc.), e-mail (such as Gmail™, Outlook™, Yahoo! Mail™, etc.), file sharing (such as DropBox™, Google Drive™, MS One Drive™, Evernote™, etc.), calendar and scheduling (such as Google™ Calendar, MS Outlook™, etc.), etc.

The robot 190 includes a pose system 199. The pose system 199 may include code and routines for determining an object transfer pose for handover of the object 188 to the user 101. The pose system 199 will be described in more detail below with reference to FIGS. 2A-8.

In some embodiments, the pose system 199 is also stored on a server 107. The pose system 199 is depicted with dashed lines in FIG. 1 with reference to the server 107 in order to indicate that the pose system 199 is optionally an element of the server 107. In one embodiment, the pose system 199 is stored in part on the robot 190 and in part on the server 107.

The robot 190 includes one or more sensors 196. Although only one sensor 196 is depicted in FIG. 1, in practice the robot 190 may include two or more sensors 196 of various kinds. The sensor 196 is any device that detects physical changes. For example, the sensor 196 detects physical changes occurring within the user environment 198. The sensor 196 may be used to observe the user 101. The sensor data resulting from observing the user 101 may be transmitted from the robot 190 to the zone system 197 via the network 105. The zone system 197 may include functionality to analyze the sensor data and determine the inferred preferences of the user 101.

The sensor data may also be used by the robot 190 in real time or near real time to determine an object transfer pose for transferring the object 188 to the user 101. The object transfer pose may be the pose made by the robot 190 when transferring the object 188 to the user 101. For example, the object transfer pose may be a pose that causes the robot to place the object 188 at a point in three-dimensional or six-dimensional space in the user environment 198 that may be optimal or compatible for handover of the object 188 to the user 101. An optimal or compatible point may be a point that is consistent with the preferences of the user 101 while also minimizing the moments or forces applied to the joints of the user 101. The preferences of the user may indicate the preferences of the user regarding: a pose for the user to assume when receiving the object 188; a point in space where the user may prefer to receive the object 188; a particular joint or combination of joints that are considered by the user 101 or medical input provider 170 to require less moments or forces applied to them; etc.

The sensor 196 will be described in more detail below with reference to FIGS. 2A and 2B.

The server 107 is a processor-based computing device that includes a tangible or non-transitory memory and a processor. For example, the server 107 may be a laptop computer, a desktop computer, a tablet computer, a mobile telephone, a PDA, a mobile e-mail device, a portable game player, a portable music player, a connected device or wearable computer, a television with one or more processors embedded therein or coupled thereto, a vehicle, or other electronic device capable of accessing the network 105.

The server 107 includes user data 192, object data 194 and a zone system 197. The user data 192 or the object data 194 may be stored on a tangible or non-transitory memory of the server 107 or robot 190.

The user data 192 is any data describing the user 101. In one embodiment, the user data 192 does not describe a generic user, but instead describes a specific user 101 to be assisted by the robot 190. In one embodiment, the user data 192 may describe one or more of the following: the weight of the user 101; the height of the user 101; the range of motion of one or more joints of the user 101 (the joints of the user may include one or more of the shoulders, elbows, wrists or vertebrae of the user 101); moment limits of the joints of the user 101 (e.g. the moments described below with reference to FIGS. 7B-7E); the express preferences of the user 101 in general; the express preferences of the user 101 for receiving the object 188 from the robot 190; the inferred preferences of the user 101 based on observation of the user 101 by the sensors 196; the inferred preferences of the user 101 based on input provided by the medical input provider 170; and any other biomechanical data related to the user 101 whether express or inferred by the zone system 197. In some embodiments, the data 271-276 described below with reference to FIG. 2A may be included in the user data 192.

The object data 194 may include any data describing the object 188. For example, the object data 194 may describe the physical dimensions of the object 188, the density of the object 188, the center of gravity for the object 188, hot spots located on the object 188 (e.g., any area or region of the object that has a temperature above ninety degrees Celsius or some other temperature specified by the express or inferred preferences of the user 101), cold spots located on the object 188 (e.g., any area or region of the object that has a temperature below 10 degrees Celsius or some other temperature specified by the express or inferred preferences of the user 101), a physical model of the object 188 or the location of points of interest located on the object 188 (e.g., the location of a handle of the object 188, the opening or dispensing region of the object 188 if the object is a vessel, sharp points, sharp edges, soft points, soft edges, etc.).

The zone system 197 may include code and routines for determining one or more candidate zones for handover of the object 188 to the user 101. A candidate zone may be a point in three-dimensional space in the user environment 198 that may be optimal or compatible for handover of the object 188 to the user 101. The zone system 197 will be described in more detail below with reference to FIGS. 2A-8.

In some embodiments, the zone system 197 is also stored on the robot 190. The zone system 197 is depicted with dashed lines in FIG. 1 with reference to the robot 190 in order to indicate that the zone system 197 is optionally an element of the robot 190. In one embodiment, the zone system 197 is stored in part on the robot 190 and in part on the server 107.

In some embodiments, the pose system 199 or the zone system 197 may be implemented using hardware including a field-programmable gate array ("FPGA") or an application-specific integrated circuit ("ASIC"). In some other embodiments, the pose system 199 or the zone system 197 may be implemented using a combination of hardware and software. The pose system 199 or the zone system 197 may be stored in a combination of the devices and servers, or in one of the devices or servers.

Example Zone System

Figure 2A:
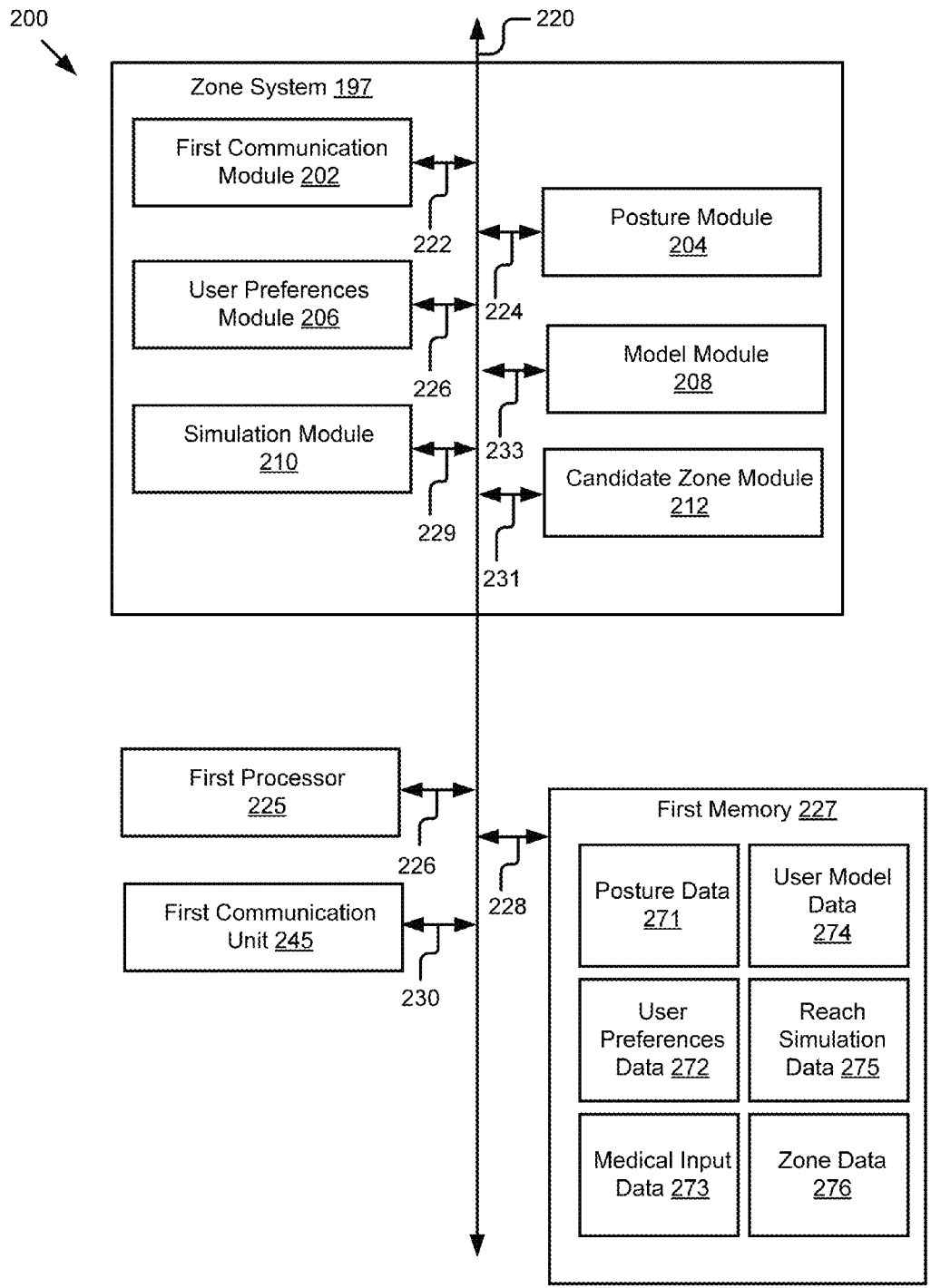
FIG. 2A is a block diagram illustrating an example zone system.

Referring now to FIG. 2A, an example of the zone system 197 is shown in more detail. FIG. 2A is a block diagram of a system 200. The system 200 may be the server 107 or the robot 190 in the system 100 illustrated in FIG. 1. The system 200 may include the zone system 197, a first processor 225, a first memory 227 and a first communication unit 245 according to some examples. The components of the system 200 are communicatively coupled by a bus 220. Although only one zone system 197, one first processor 225, one first memory 227 and one first communication unit 245 are depicted in FIG. 2A, in practice the system 200 may include two or more zone systems 197, two or more processors 225, two or more first memories 227 and two or more first communication units 245.

The first processor 225 includes an arithmetic logic unit, a microprocessor, a general-purpose controller, or some other processor array to perform computations and provide electronic display signals to a display device. The first processor 225 is coupled to the bus 220 for communication with the other components via a signal line 226. The first processor 225 processes data signals and may include various computing architectures including a complex instruction set computer (CISC) architecture, a reduced instruction set computer (RISC) architecture, or an architecture implementing a combination of instruction sets. Although FIG. 2A includes a single first processor 225, multiple first processors 225 may be included. Other processors, operating systems, sensors, displays, and physical configurations may be possible.

In one embodiment, the first processor 226 is programmed to execute one or more steps of a method. For example, the first processor 226 is programmed to execute one or more steps of methods 300, 400 or 500 described below with reference to FIGS. 3, 4 and 5. The first processor 225 or the system 200 may include hardware circuitry configured for execution of one or more of the steps of the methods 300, 400 or 500.

The first memory 227 is a tangible or non-transitory computer-readable memory. The first memory 227 stores instructions or data that may be executed by the first processor 225. The first memory 227 is coupled to the bus 220 for communication with the other components via a signal line 228. The instructions or data may include code for performing the techniques described herein. The first memory 227 may be a dynamic random access memory (DRAM) device, a static random access memory (SRAM) device, flash memory, or some other memory device. In some embodiments, the first memory 227 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As illustrated in FIG. 2A, the first memory 227 stores posture data 271, user preferences data 272, medical input data 273, user model data 274, reach simulation data 275 and zone data 276. The first memory 227 may also store other data for providing the functionality described herein.

The posture data 271 may include data describing the posture of the user 101 when reaching for various locations by their right or left hand. The posture data 271 may be based on the observations of the sensors 196 or the medical input provider 170. The posture data 271 may be specific to a particular user 101.

The user preferences data 272 may include data describing the preferences of the user 101. The user preferences data 272 may be based on expressed input provided by the user 101. For example, the user 101 provides answers to questions relating to their preferences for receiving an object 188 from the robot 190 and these answers are stored as user preferences data 272. The user preferences data 272 may be based on observations of the user 101 provided by the medical input provider 170. The user preferences data 272 may also be based on sensor data determined by one or more sensors 196 observing the user 101. The user preferences module 206 may then receive and analyze the sensor data to infer the preferences of the user 101. In one embodiment, the user preferences data 272 is based on any combination of express or inferred preferences of the user 101.

The medical input data 273 is any data based on input provided by the medical input provider 170.

The user model data 274 may include data describing one or more user models. The user model data 274 may be specific to the user 101. The user model data 274 may be determined by the model module 208 of the zone system 197 based on any combination of the user data 192, object data 194 or the sensor data of the sensor 196. The user model data 274 may describe one or more user models for the user 101. The user model described by the user model data 274 may be one or more of a kinematic model describing the user 101, a biomechanical model describing the user 101 or a link model describing the user 101.

In one embodiment, the model module 208 may determine user model data 274 describing a biomechanical model for the user 101 by analyzing any combination of the user data 192, object data 194 or sensor data to determine a static distribution of moment or force vectors at one or more of the joints of the user 101. For example, the user model data 274 includes data describing the example biomechanical model described below with reference to FIG. 6A.

In one embodiment, model module 208 may determine user model data 274 describing a link model for the user 101 by analyzing any combination of the biomechanical model for the user 101, user data 192, object data 194 or sensor data to determine a linkage representation. For example, the user model data 274 includes data describing the example link model described below with reference to FIG. 6B.

The reach simulation data 275 may include data describing one or more reach simulations for the user 101. The reach simulation data 275 may be specific to the user 101. The reach simulation data 275 may be determined by the simulation module 210 based on any combination of the sensor data of the sensor 196 or the data 271-274 described above. For example, the reach simulation data is determined based on (1) the preferences of the user 101 as inferred from observation of the user with one or more sensors 196 or medial input provided by the medical input provider 170 for the user 101, and (2) the biomechanical model for the user 101. In one embodiment, the reach simulation may be a reach simulation map.

The zone data 276 includes data describing one or more candidate zones for handing over the object 188 to the user 101.

The first communication unit 245 transmits and receives data to and from at least one of the server 107 and the robot 190 in the system 100. The first communication unit 245 is coupled to the bus 220 via a signal line 230. In some embodiments, the first communication unit 245 includes a port for direct physical connection to the network 105 or to another communication channel. For example, the first communication unit 245 includes a USB, SD, CAT-5, or similar port for wired communication with other entities in the system 100. In some embodiments, the first communication unit 245 includes a wireless transceiver for exchanging data with other entities in the system 100 or other communication channels using one or more wireless communication methods, including IEEE 802.11, IEEE 802.16, Bluetooth®, or another suitable wireless communication method.

In some embodiments, the first communication unit 245 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 245 includes a wired port and a wireless transceiver. The first communication unit 245 also provides other conventional connections to the network 105 for distribution of files or media objects using standard network protocols including TCP/IP, HTTP, HTTPS, and SMTP, etc.

In the illustrated implementation shown in FIG. 2A, the zone system 197 includes a first communication module 202, a posture module 204, a user preferences module 206, a model module 208, a simulation module 210, and a candidate zone module 212. These modules of the zone system 197 are communicatively coupled to each other via the bus 220.

In some embodiments, modules of the zone system 197 may be stored in a single server or device. In some other embodiments, modules of the zone system 197 may be distributed and stored across multiple servers or devices. Furthermore, the separation of various components, modules, and servers in the embodiments described herein should not be understood as requiring such separation in all embodiments. In some embodiments, the described components, modules, devices, or servers can generally be integrated together in a single component, module, device, or server.

In some embodiments, each of the modules 202, 204, 206, 208, 210, 212 and 214 in the zone system 197 can be a set of instructions executable by the first processor 225 to provide the functionality described below. In some other embodiments, each of the modules 202, 204, 206, 208, 210, 212 and 214 can be stored in the first memory 227 and can be accessible and executable by the first processor 225 of the system 200. Each of the modules 202, 204, 206, 208, 210, 212 and 214 may be adapted for cooperation and communication with the first processor 225 and other components of the system 200. In some embodiments, each of the modules 202, 204, 206, 208, 210, 212 and 214 may be adapted to function as one or more thin clients that are stored and executed by the first processor 225 of the system 200.

The first communication module 202 may be software including routines for handling communications between the zone system 197 and other components of the system 200. In some embodiments, the first communication module 202 may be a set of instructions executable by the first processor 225 to provide the functionality described below for handling communications. The first communication module 202 may be communicatively coupled to the bus 220 via signal line 222.

The first communication module 202 sends and receives data, via the communication unit 245, to and from one or more of the server 107 and the robots 190. For example, the first communication module 202 receives, via the communication unit 245, sensor data from the robot 190 indicating the express or inferred preferences of the user 101.

In some embodiments, the first communication module 202 receives data from components of the zone system 197 and stores the data in the first memory 227. In some embodiments, the first communication module 202 retrieves data from the first memory 227 and sends the data to one or more components of the zone system 197. In some embodiments, the first communication module 202 may handle communications between components of the zone system 197. For example, the first communication module 202 receives data from one module of the zone system 197 and sends the data to another module of the zone system 197. In one embodiment, the first communication module 202 receives any combination of sensor data, user data 192 and object data 194. The user data 192 may include, among other things, medical input data 273 or data describing the express input of the user 101. In one embodiment, the medical input data 273 may be determined by analyzing or parsing the notes of the medical input provider 170. The medical input data 272 may also be determined by zone system 197 analyzing the answers of the medical input provider 170 as provided to an electronic or hardcopy questionnaire.

The posture module 204 may be software including routines for determining the posture data 271 based on any combination of the sensor data, user data 192 or object data 194. For example, the posture module 204 analyzes sensor data describing the observed posture of the user 101 and medical input data 273 describing the posture of the user 101 as observed by the medical input provider 170. The posture module 204 then determines data describing the posture of the user 101 based on this analysis.

The posture module 204 may also determine biomechanical data for the user 101. For example, the posture module 2014 determines biomechanical data specific for the user 101 based on any combination of the sensor data, user data 192, medical input data 273 and express input of the user 101. In one embodiment, the posture module 204 analyses one or more of the sensor data, user data 192, medical input data 273 or express input of the user 101 to determine one or more of the following: the weight of the user 101; the height of the user 101; the range of motion of one or more joints of the user 101 (the joints of the user may include one or more of the shoulders, elbows, wrists or vertebrae of the user 101); moment limits of the joints of the user 101 (e.g. the moments described below with reference to FIGS. 7B-7E); and any other biomechanical data related to the user 101 whether express or inferred by the zone system 197.

The posture module 204 may be communicatively coupled to the bus 220 via signal line 224.

The user preferences module 206 may be software including routines for determining the user preferences data 272. For example, the user preferences module 206 determines the user preferences data 272 based on any combination of the sensor data, user data 192, object data 194, medical input data 273 and express input of the user 101. In one embodiment, the user preferences module 206 analyses one or more of the sensor data, user data 192, object data 194, medical input data 273 or express input of the user 101 to determine one or more of the following: the express preferences of the user 101 in general; the express preferences of the user 101 for receiving the object 188 from the robot 190; the inferred preferences of the user 101 based on observation of the user 101 by the sensors 196; or the inferred preferences of the user 101 based on input provided by the medical input provider 170.

The user preferences module 206 may be communicatively coupled to the bus 220 via signal line 226.

The model module 208 may be software including routines for determining the user model data 274. For example, the model module 208 determines the user model data 274 based on any combination of the sensor data, user data 192, object handling constraints as indicated by the object data 194, medical input data 273, the express input of the user 101, the posture data 271; the biomechanical data for the user 101; and the user preferences data 272. In one embodiment, the model module 208 analyses one or more of the sensor data, user data 192, object data 194, medical input data 273 or express input of the user 101 to determine one or more of the following: a kinematic model describing the user 101, a biomechanical model describing the user 101 or a link model describing the user 101.

In one embodiment, the model module 208 may determine user model data 274 describing a biomechanical model for the user 101 by analyzing any combination of the user data 192, object data 194 or sensor data to determine a static distribution of moment or force vectors at one or more of the joints of the user 101. For example, the user model data 274 includes data describing the example biomechanical model described below with reference to FIG. 6A.

In one embodiment, model module 208 may determine user model data 274 describing a link model for the user 101 by analyzing any combination of the biomechanical model for the user 101, user data 192, object data 194 or sensor data to determine a linkage representation. For example, the user model data 274 includes data describing the example link model described below with reference to FIG. 6B.

The model module 208 may be communicatively coupled to the bus 220 via signal line 233.

The simulation module 210 may be software including routines for determining the reach simulation data 275. For example, the simulation module 210 determines the user model data 274 based on any combination of the sensor data, user data 192, object data 194, medical input data 273, the express input of the user 101, the posture data 271, the user preferences data 272, and the user model data 274. In one embodiment, the simulation module 208 analyses one or more of the sensor data, user data 192, object data 194, medical input data 273, the express input of the user 101, the posture data 271, the user preferences data 272, and the user model data 274 to determine one or more reach simulations for the user 101. Examples of reach simulations for the user 101 are described below with reference to FIGS. 7B-7E.

The simulation module 210 may be communicatively coupled to the bus 220 via signal line 229.

The candidate zone module 212 may be software including routines for determining one or more candidate zones. For example, the candidate zone module 212 determines one or more candidate zones based on the reach simulations described by the reach simulation data 275.

In one embodiment, the candidate zone module 212 determines one or more candidate zones by applying an iterative machine learning approach to the reach simulations described by the reach simulation data 275.

In one embodiment, the candidate zone module 212 determines one or more candidate zones. For example, the candidate zone module 212 determines one or more candidate zones by an iterative analysis to place candidate zones in groups of similar candidate zones. In one embodiment, the iterative analysis may be a cluster analysis. For example, the candidate zone module 212 divides the reach simulations described by the reach simulation data 275 into clusters of similar points.

In one embodiment, the points may be a Cartesian (X, Y, Z) point in space that the user 101 will reach or approximately reach when moving their body in accordance with a given reach simulation. The candidate zone module 212 may determine the (X, Y, Z) points indicated by different reach simulations and cluster the reach simulations into similar points. For example, the candidate zone module 212 may determine that two or more points are similar if the points result in a similar amount of torque or force being applied to a particular joint of the user when the user is reaching for those points. In another example, the candidate zone module 212 divides three-dimensional space of the user environment 198 into three-dimensional regions based on clustering analysis and may determine that two or more points are similar if the points are in the same region.

In one embodiment, the points may be a six-dimensional point in space that the user 101 will reach or approximately reach when moving their body in accordance with a given reach simulation. The candidate zone module 212 may determine the (X, Y, Z) points indicated by different reach simulations as well as three orientations (e.g., pitch, yaw, roll, etc.) and cluster the reach simulations into similar points.

In one embodiment, the user reach simulation includes a value for one or more points in space for the user environment 198. In one embodiment, the user reach simulation includes a value for each three-dimensional or six-dimensional point in space for the user environment 198.

Figure 7A:
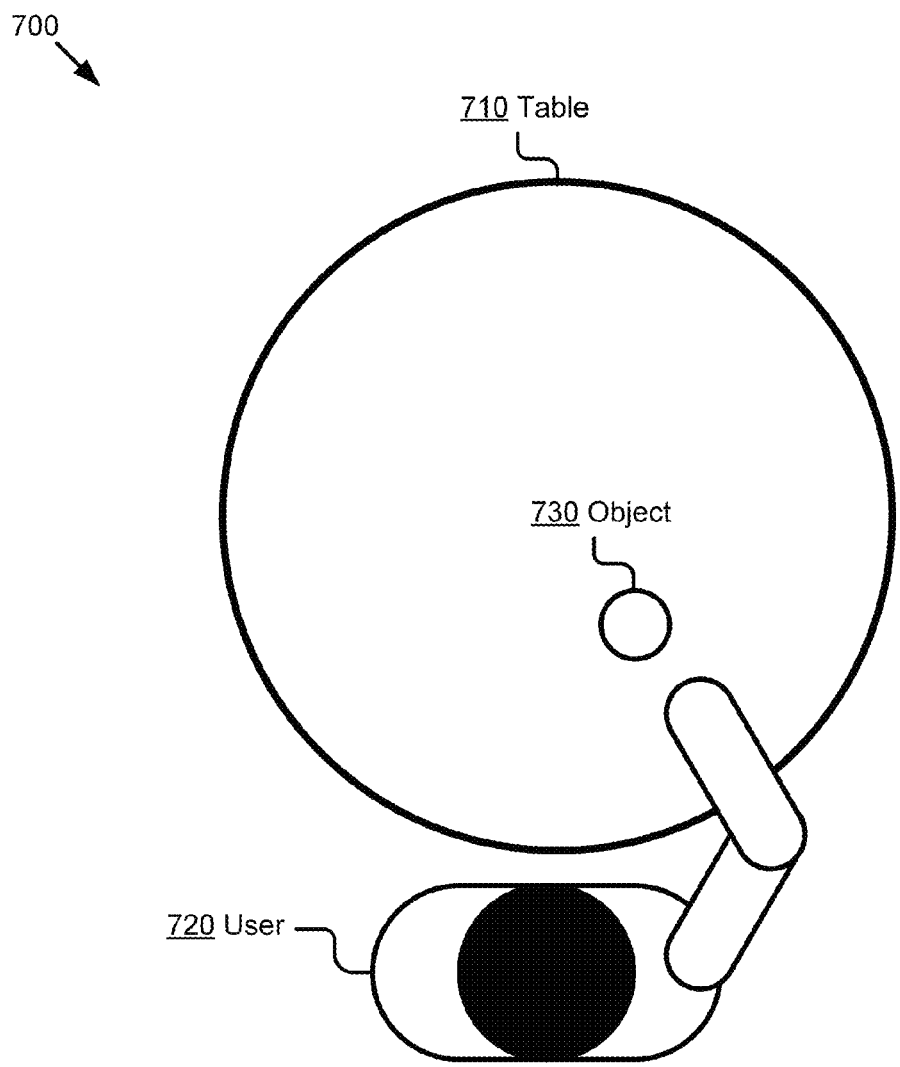
FIG. 7A is a block diagram illustrating an example user reach scenario.
Figure 7B:
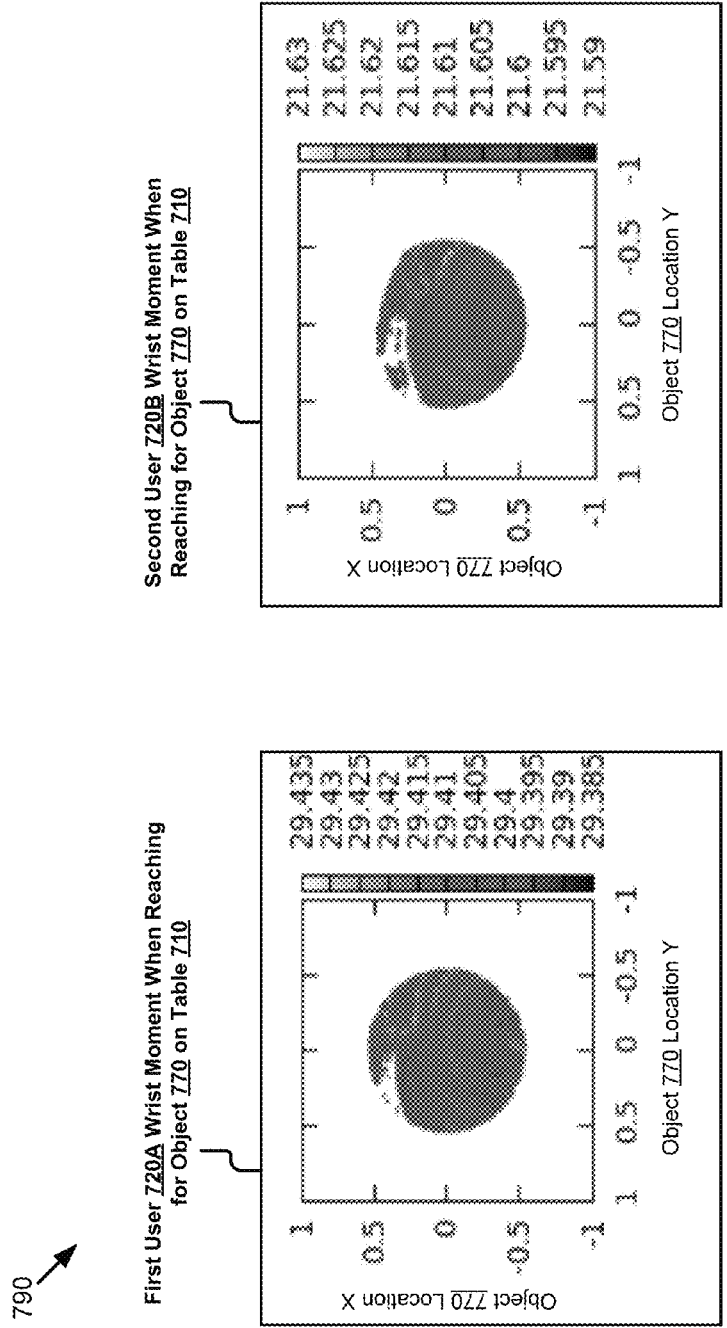
FIGS. 7B-7E are charts depicting two dimensional examples of a user reach simulation maps.
Figure 7C:
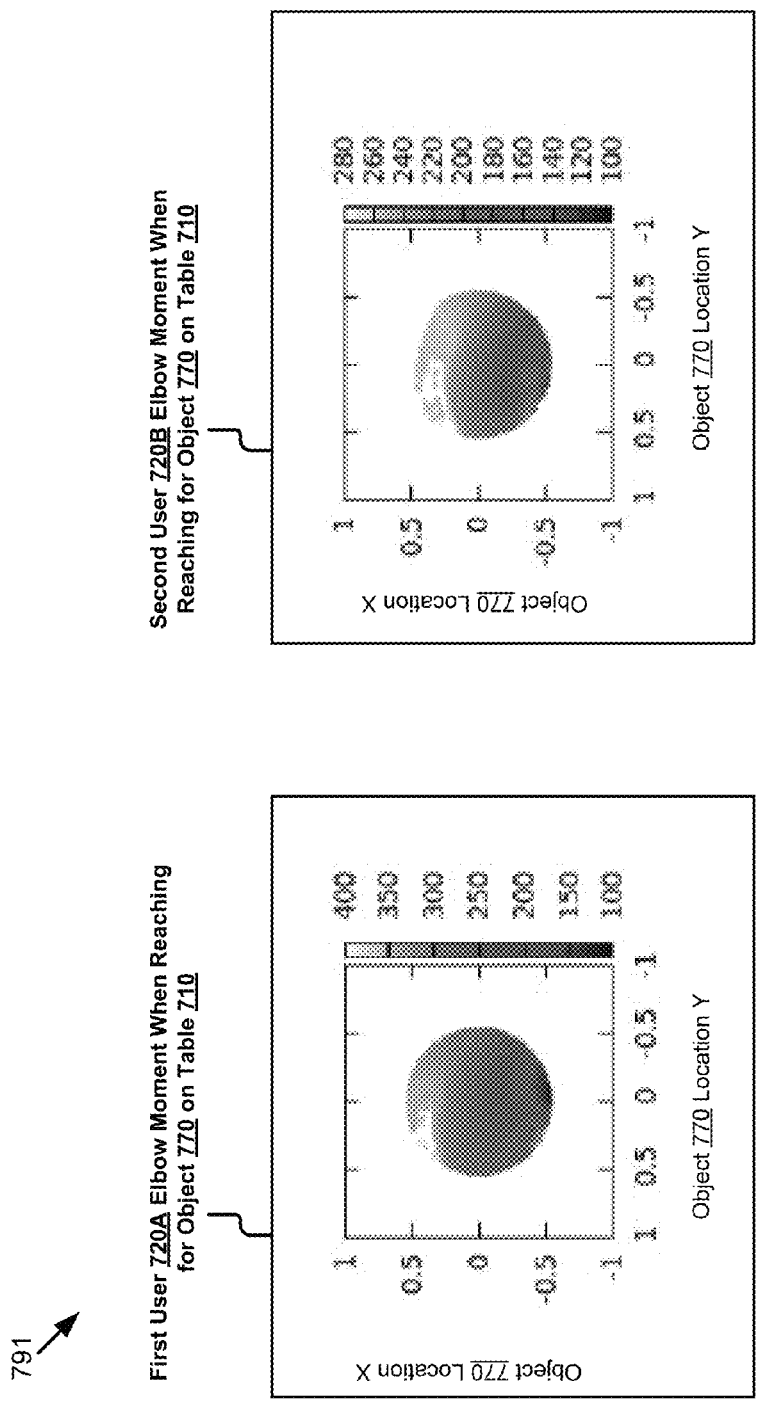
Figure 7D:
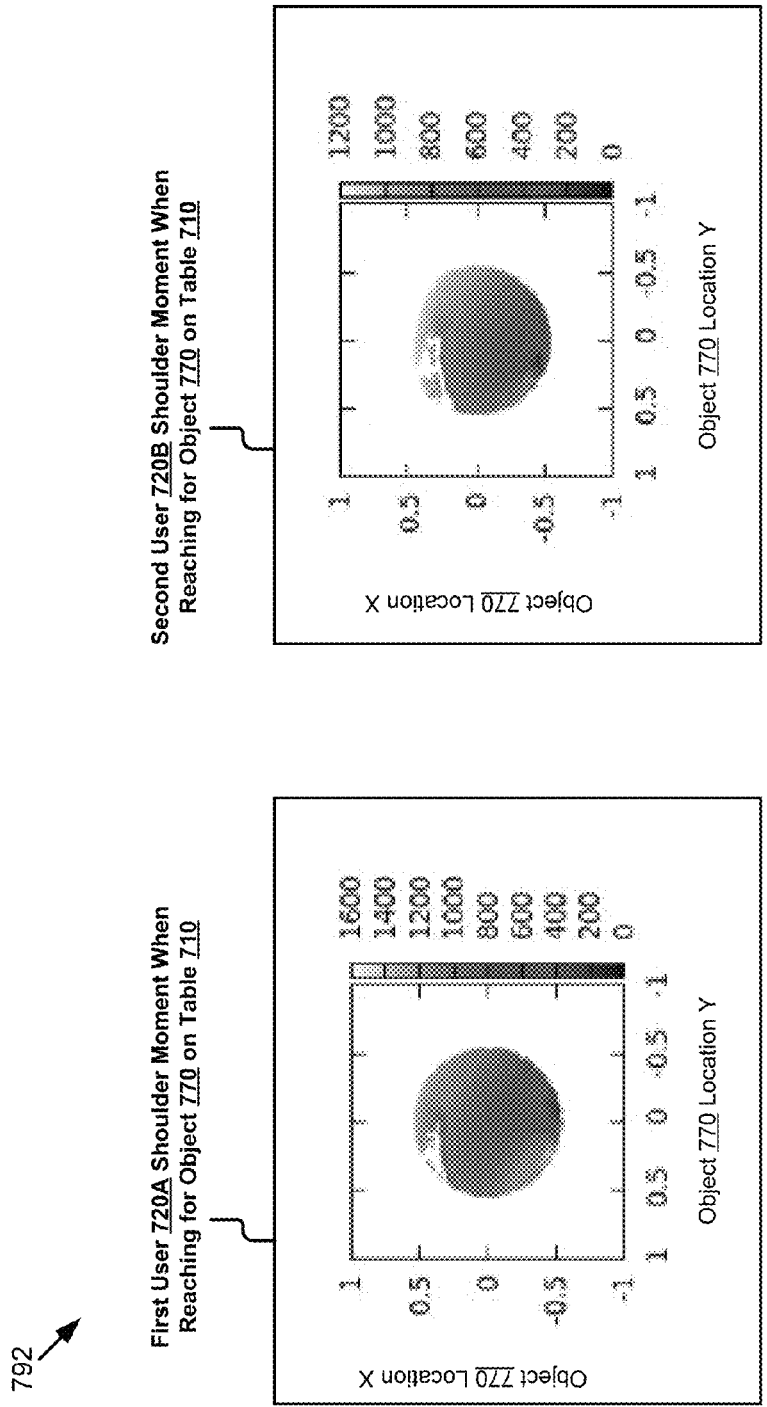
Figure 7E:
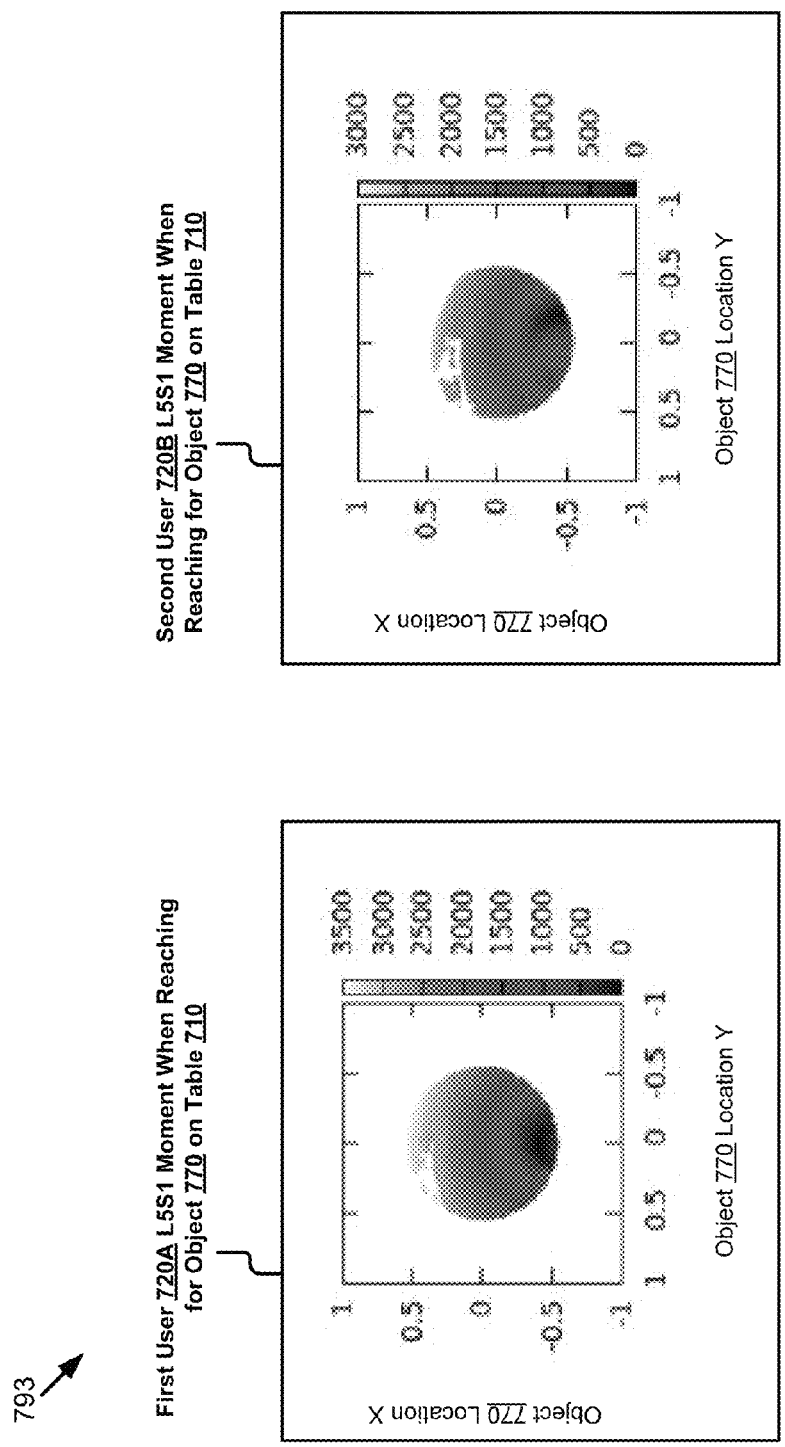

For example, the user reach simulation indicates one or more moments or forces applied to one or more joints of the user 101 when reaching in accordance with the user reach scenario (e.g., see element 700 depicted in FIG. 7A). The user reach simulation may correspond to the user 101 reaching to a point in a user environment 198. The user reach simulation may be based on simulating the user 101 reaching to one or more points in the user environment 198. For example, the user reach simulation is based on simulating the user 101 reaching for every three-dimensional point in the user environment 198. Generating the user reach simulations or the candidate zones may include analyzing the reach simulations to assign a value to each three-dimensional or point in the user environment 198 or six-dimensional point in the user environment 198. Each value may be based on one or more of the following: (1) the moments or forces applied to one or more joints of the user 101 when reaching to a particular point in the user environment 198; and (2) whether the point, moments or forces are consistent with the user preferences for receiving the object 188 from a robot 190. The values may be determined by the simulation module 210 or the candidate zone module 214 based at least in part on the user preferences data 272 and the reach simulation data 275 which includes data describing the moments or forces applied to one or more of the user joints when reaching for the three-dimensional or six-dimensional point in space corresponding to the user reach simulation. In this way, the zone system 197 may consider every point in the user environment and determine a zone of points that minimize the moments or forces applied to the joints of the user 101 while also being consistent with the preferences of the user 101. One beneficial aspect may be consideration of the preferences of the user 101 when determining the candidate zones or object transfer poses.

In one embodiment, the clusters are formed from points that have similar values. For example, the clusters may be based on the value determined based on the preferences of the user and the moments or forces applied to the joints of the user.

The clusters may be stored on the first memory 227 as zone data 276. The clusters may be stored a list of ordered clusters. The candidate zone module 212 may determine the clusters by connectivity based clustering, distribution-based clustering or a similar analysis.

In one embodiment, the clusters of reach simulations are ordered in such a way as to minimize the estimated risk or harm to the user 101 when reaching for the object 188 being handed to them by the robot 190. For example, the clusters of simulations may be ordered so that the moment (i.e., torque) or force applied to the user 101 when reaching for the object is less based on the particular condition of the user 101. For example, if the user 101 has a sore left shoulder, then the clusters of reach simulations may be ordered to minimize the moment applied to the left shoulder of the user 101 when reaching for the object 188. The ordered list of clusters may then the analyzed by the candidate zone module 214 or the pose system 199 of the robot to indicate an object transfer pose for the robot 190 to assume for handover of the object 188 to the user 101. In this way the object transfer pose may be optimized to limit the risk or harm to the user 101.

The candidate zone module 214 may be communicatively coupled to the bus 220 via signal line 231.

Example Pose System

Figure 2B:
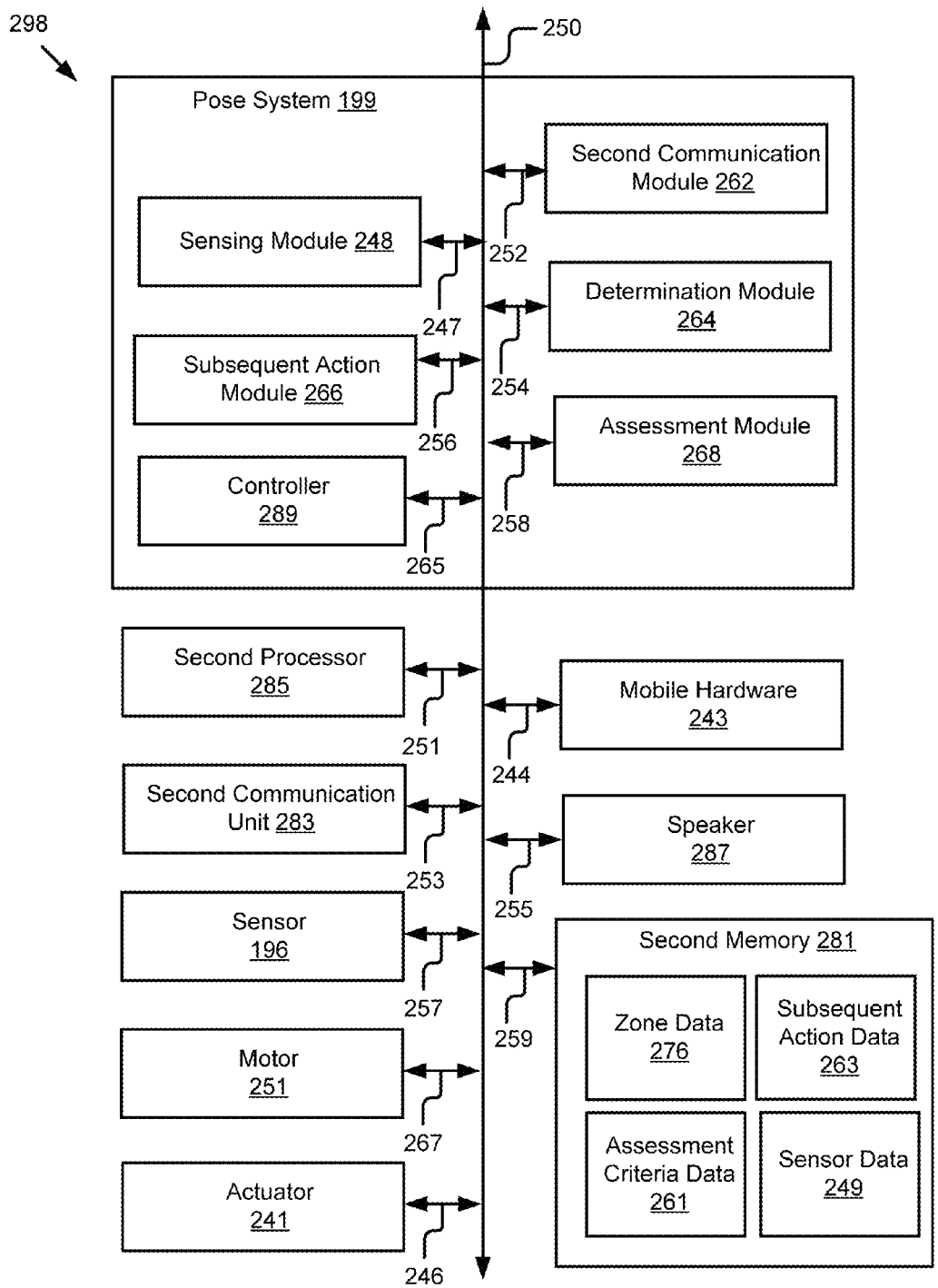
FIG. 2B is a block diagram illustrating an example pose system.

Referring now to FIG. 2B, an example of the pose system 199 is shown in more detail. FIG. 2B is a block diagram of a system 298. The system 298 may be the server 107 or the robot 190 in the system 100 illustrated in FIG. 1. The system 298 may include the pose system 199, a second processor 285, a second memory 281, a second communication unit 283, a speaker 287, a sensor 196, a motor 251, mobile hardware 243 and an actuator 241 according to some examples. The components of the system 298 are communicatively coupled by a bus 250. Although only one pose system 199, one second processor 284, one second memory 281, one second communication unit 283, one speaker 287, one sensor 196, one motor 251, one mobile hardware 243 and one actuator 241 are depicted in FIG. 2B, in practice the system 298 may include two or more pose systems 199, two or more second processors 284, two or more second memories 281, two or more second communication units 283, two or more speakers 287, two or more sensors 196, two or more motors 251, two or more elements of mobile hardware 243 and two or more actuators 245.

The second processor 285, second communication unit 283 and second memory 281 include functionality similar to the first processor 225, first communication unit 245 and the first memory 227, and so, the description of these elements will not be repeated here.

As illustrated in FIG. 2B, the second memory 281 stores zone data 276, assessment criteria data 261, subsequent action data 263 and sensor data 249. The second memory 281 may also store other data for providing the functionality described herein.

The zone data 276 was described above with reference to FIG. 2A, and so, this description will not be repeated here. The first communication unit 245 may transmit the zone data 276 to the second communication unit 283 via the network 105. The second communication unit 283 may store the zone data 276 on the second memory 281 or transmit the zone data 276 to the second communication module 262 for transfer to some other element of the pose system 199.

The sensor data 249 may include any data resulting from the sensing of one or more sensors 196.

The assessment criteria data 261 may include data describing assessment criteria used to assess the candidate zones described by the zone data 276. The candidate zones may be assessed by the assessment module 268 based on the current conditions present within the user environment 198 based on the observation or sensing of the one or more sensors 196. The assessment criteria data 261 may be determined by the determination module 264 based on sensor data 249. For example, the assessment criteria data 261 may describe the current observation of the user 101, object 188 or user environment 198 by one or more of the sensors 196, the estimated time for the user 101 to reach the object 188 when the robot 190 begins assuming the object transfer pose, the present comfort or stress level of the user 101, or the visibility of the highest ranked candidate zones by one or more of the sensors 196.

In one embodiment, the object 188 is a sharp object such as a knife and the distance from the robot 190 or object 188 to the head or body of the user 101 is included as an assessment criteria determined by the determination module 264.

In another embodiment, whether the hands of the user 101 are currently occupied with other objects is an assessment criteria determined by the determination module 264. The assessment module 268 may analyze this criteria and determine an object transfer pose that places the object 188 in the left hand of the user 101 if the right hand of the user 101 is currently occupied at the time of the determining an object transfer pose.

The subsequent action data 263 may describe the user's likely action after receiving the object 188 from the robot 190. The subsequent action data 263 may be based on an explicit input. For example, the subsequent action data 263 is based on an explicit input from the user 101 or the medical input provider 170.

In one embodiment, the sensors 196 of the system 298 may include a microphone and functionality to convert the speech of the user 101 to text. For example, the user 101 may speak their next action after receiving the object 188 and the system 298 may convert this input to subsequent action data 263. In another embodiment, the computer, smartphone, wearable device or similar processor-based device of the user 101 may include functionality to convert the speech of the user 101 to text and transmit the text to the second communication unit 283 of the system 298. For example, the user 101 provides an explicit speech-based instruction for the robot 190 to the smartphone of the user 101, the smartphone coverts the speech to text and transmits data describing the explicit instruction of the user to the system 298 via Bluetooth, WiFi, USB or some other communicative coupling between the smartphone and the system 298. The medical input provider 170 may provide instructions to the robot 190 in a similar manner.

In one embodiment, the system 298 includes a keyboard or some other input peripheral and the user 101 or medical input provider 170 may provide the subsequent action input 263 via text or any other form of explicit input. Text-based input may also be provided by the computer, smartphone, wearable device or similar processor-based device of the user 101 and then transmitted to the second communication unit 283 of the system 298.

In one embodiment, the determination module 264 may include functionality to analyze any combination of the sensor data 249, medical input data 273 or user preferences data 272 to determine the habits or patterns of the user 101 and determine an estimated next action for the user 101 based on the habits or patterns of the user 101 under similar conditions as indicated by any combination of the sensor data 249, medical input data 273 or user preferences data 272.

In the illustrated implementation shown in FIG. 2B, the pose system 199 includes a second communication module 262, a sensing module 248, a determination module 264, a subsequent action module 266, an assessment module 268 and a controller 289. These elements of the pose system 199 are communicatively coupled to each other via the bus 250.

In some embodiments, modules of the pose system 199 may be stored in a single server or device. In some other embodiments, modules of the pose system 199 may be distributed and stored across multiple servers or devices. Furthermore, the separation of various components, modules, and servers in the embodiments described herein should not be understood as requiring such separation in all embodiments. In some embodiments, the described components, modules, devices, or servers can generally be integrated together in a single component, module, device, or server.

The sensor 196 is any device that senses physical changes. The sensor 196 is coupled to the bus 250 via signal line 257. In one embodiment, the sensor 196 is a motion detector. For example, the sensor 196 is a gyroscope that measures orientation of the robot 190, user 101, object 188 or any other element of the user environment 198. In another example, the sensor 196 is an accelerometer that is used to measure acceleration of the robot 190, user 101, object 188 or any other element of the user environment 198. In yet another example, the sensor 196 includes location detection, such as a global positioning system (GPS), location detection through triangulation via a wireless network, etc. In some embodiments, the sensor 196 transmits the location information to the sensing module 248 via the second communication module 262. In other embodiments, the sensor 196 stores the location information as part of the sensor data 249 or the assessment criteria data 261 in the second memory 281.

In some embodiments, the sensor 196 may include a depth sensor. In some embodiments, the depth sensor determines depth using structured light, such as a speckle pattern of infrared laser light. In another embodiment, the depth sensor determines depth using time-of-flight technology that determines depth based on the time it takes a light signal to travel between the camera and an object. For example, the depth sensor is a laser rangefinder. The depth sensor may be used to identify elements of the user environment 198 and their depths. In some embodiments, the sensor 196 transmits the depth information to the sensing module 248 for identifying the position of the robot 190, user 101, object 188 or any other element of the user environment 198. In other embodiments, the sensor 196 stores the depth information as part of the sensor data 249 or the assessment criteria data 261 in the memory 227.

In one embodiment, the sensor 196 includes a microphone for converting sound into electrical signals. The microphone may receive instructions from a user 101 or medical input provider 170 for fulfilling a request, such as providing an explicit instruction or input to the robot 190. The microphone transmits the electrical signals to the sensing module 248 for processing of the instructions.

The sensor 196 may be a camera. The camera may be a physical device for capturing images. In one embodiment, the camera captures electronic images. The camera may include an image sensor, such as a charge-coupled device (CCD) or a complementary metal-oxide semiconductor (CMOS) for converting an optical image to electrical signals. In one embodiment, the camera sends the electrical signals to the sensing module 248 for identifying the position of users 101, objects 188 and robots 190, the assessment module 268 for assessing the chosen object transfer pose and determining a new object transfer pose based on new data indicating risk to the user 101. In another embodiment, the camera 249 stores the electrical signals in the memory 227 as part of the position data 292.

In embodiments where the system 298 is a robot 190, the system 298 includes a motor 251, mobile hardware 243 and an actuator 241. The motor 251 is coupled to the bus 250 via signal line 267. The mobile hardware 243 is coupled to the bus 250 via signal line 244. The actuator 241 is coupled to the bus 250 by signal line 246.

The motor 251 includes hardware for powering the mobile hardware 243. The mobile hardware 243 includes hardware for moving the robot 190, such as wheels. The motor 251 and the mobile hardware 243 are used to move the robot 190. For example, the controller 289 instructs the motor 251 to drive the mobile hardware 243 to reposition the robot 190 based, for example, on the object transfer pose selected by the pose system 199.

The actuator 241 may be hardware for gripping the object 188 and positioning the object 188 for handover to the user 101 based on the object transfer pose selected by the pose system 199. The actuator 241 may include self-contained motors or be driven by one or more of the motors 251 of the robot 190. The motors of the actuator 241 may be servo motors. For embodiments where the actuator 241 includes its own motors, the controller 289 may instruct the actuator 241 to position the object 188 based on the object transfer pose and handover the object 188 to the user 101. For embodiments where the actuator 241 is driven by a motor 251 of the robot 190, the controller 289 may instruct the motor 251 to position the actuator 241 based on the object transfer pose and handover the object 188 to the user 101.

The speaker 267 is optional hardware for generating audible alerts that is coupled to the bus 250 via signal line 255. For example, where the system 298 is a robot 190, the speaker may be instructed by the assessment module 268 to inform the user 101 that handover of the object 188 to the user 101 cannot occur because of a circumstance determined by the assessment module 268 to pose a risk exceeding a threshold.

In some embodiments, each of the elements 262, 248, 264, 266, 268 and 289 in the pose system 199 can be a set of instructions executable by the second processor 285 to provide the functionality described below. In some other embodiments, each of the modules 262, 248, 264, 266, 268 and 289 can be stored in the second memory 281 and can be accessible and executable by the second processor 285 of the system 298. Each of the modules 262, 248, 264, 266, 268 and 289 may be adapted for cooperation and communication with the second processor 285 and other components of the system 298. In some embodiments, each of the modules 262, 248, 264, 266, 268 and 289 may be adapted to function as one or more thin clients that are stored and executed by the second processor 285 of the system 298.

The second communication module 262 provides functionality similar to the first communication module 202, and so, that description will not be repeated here. The second communication module 262 may be communicatively coupled to the bus 250 via signal line 252.

The sensing module 248 may be software including routines for detecting users 101, estimating the position, orientation and assessment criteria of users 101, determining a current position of the robot 190, determining the position, orientation and assessment criteria associated with the object 188, detecting other elements in the user environment 198 and estimating the position, orientation and assessment criteria of the elements in the user environment 198. In some embodiments, the sensing module 248 can be a set of instructions executable by the second processor 285 to provide the functionality described below for sensing user 101, robot 190, object 188 and other elements of the user environment 198. The sensing module 248 may be communicatively coupled to the bus 250 via signal line 247.

In some embodiments, the sensing module 248 receives images from a sensor 196 that is a camera via the second communication module 262. The sensing module 248 identifies the location and orientation of the user 101, robot 190, object 188 and other elements of the user environment 198 from the images. The location may be expressed as longitude and latitude coordinates, according to a Cartesian coordinate system, etc. For example, the sensing module 248 identifies the object 188 and sharp edges along an edge of the object 188. The sensing module 248 also identifies the user 101 and that their right hand is free but their left hand is occupied. The sensing module 248 may cooperate with the assessment module 268 and the controller 289 to identify the risk associated with the sharp edges of the object 188 and the user's 101 occupied left hand to ensure that the robot 190 places the object 188 in the right hand of the user 101 with the sharp edges of the object 188 oriented away from the palm and fingers of the user 101.

The sensing module 248 determines a current position of the user 101, robot 190, object 188 and other elements of the user environment 198. For example, the sensing module 248 uses a sensor 196 that is part of the robot 190 to determine the location of the robot 190, such as GPS, triangulating signals using WiFi, etc. In another example, the sensing module 248 determines the current position of the user 101 by receiving images from the camera 249 and comparing the location of known objects in the images to the known location of the robot 190 based, for example, on GPS coordinates for the robot 190.

The sensing module 248 may be communicatively coupled to the bus 250 via signal line 247.

The determination module 264 may be software including routines for analyzing the sensor data 249 or other data to determine the assessment criteria data 261. For example, the determination module 261 analyses an image of the user 101 included in the sensor data 249 to determine that their facial expression looks stressed or that their right or left hand is occupied. Either of these states for the user 101 may be assessment criteria affecting which object transfer pose is selected by the pose system 199.

The determination module 264 may analyze the sensor data 249 to determine the current observation of the user 101, object 188 or user environment 198, the estimated time for the user 101 to reach the object 188 when the robot 190 begins assuming the object transfer pose, the present comfort or stress level of the user 101, or the visibility of the highest ranked candidate zones by one or more of the sensors 196. The determination module 264 may determine other assessment criteria 261 based on the sensor data 249.

The determination module 264 may be communicatively coupled to the bus 250 via signal line 254.

The subsequent action module 266 may be software including routines for determining a subsequent action of the user 101 after receiving the object 188 from the robot 190. For example, the subsequent action module 266 determines the subsequent action of the user 101 after receiving the object 188 based on the subsequent action data 263.

The subsequent action module 266 may be communicatively coupled to the bus 250 via signal line 266.

The assessment module 268 may be software including routines for selecting an object transfer pose for the robot 190 handover the object 188 to the user 101. For example, the assessment module 268 may select the object transfer pose based on any combination of the zone data 276 and the assessment criteria data 261. The zone data 276 may describe candidate zones for handover of the object 188 to the user 101. The candidate zones may be ranked based on which candidate zone would result in an object transfer pose with the least possible moment (i.e., torque) or force applied to the user 101 when reaching for the object 188 from the actuator 241 of the robot 190. The assessment criteria 261 may be used to update the ranking of the candidate zones based on the current observations of the sensors 196. For example, the sensors 196 may indicate a condition of the robot 190, user 101, object 188 or any other element of the user environment 198 that causes the assessment module 268 to change the ranking of the candidate zones. In this way the assessment criteria data 261 may be used by the assessment module 268 to filter through the candidate zones to determine an object transfer pose that will result in least amount of risk to the user 101 when reaching for the object 188. For example, the object transfer pose resulting in the least risk to the user 101 may be one that results in the least amount of torque or force applied to the user 101 when reaching for the object 188. In another example, the assessment criteria may indicate an element in the user environment 198 may cause the user 101 to have an accident (e.g., trip, stumble, etc.) when reaching for the object 188, and the object transfer pose resulting in the least risk to the user 101 may be one that is less likely to result in the user 101 having an accident when reaching for the object 188. The assessment module 268 selects one of the candidate zones based on this filtering and determines an object transfer pose based on the candidate zone.

The assessment module 268 may be communicatively coupled to the bus 250 via signal line 258.

The controller 210 can be software including routines for determining the movements of the motor 251, mobile hardware 243 or the actuator 241. For example, the controller 210 receives data describing the object transfer pose from the assessment module 261 and causes the actuator 241 to move in accordance with the object transfer pose to handover the object 188 to the user 101.

The controller 210 may generate velocity constraints for the motor 251, mobile hardware 243 or the actuator 241 to follow the when handing over the object 188 to the user 101. For example, the controller 210 determines the direction and velocity for moving along a path that is in accordance with the object transfer pose. Once the controller 210 determines the velocity constraints, the controller 210 instructs the actuator 241 or the motor 251 to move in accordance with the object transfer pose. In situations where the sensor 196 detect a possible collision for the user 101, the controller 210 either generates new velocity constraints for avoiding a collision or instructs the actuator 241 or the motor 251 to stop moving.

Example Methods

Figure 3:
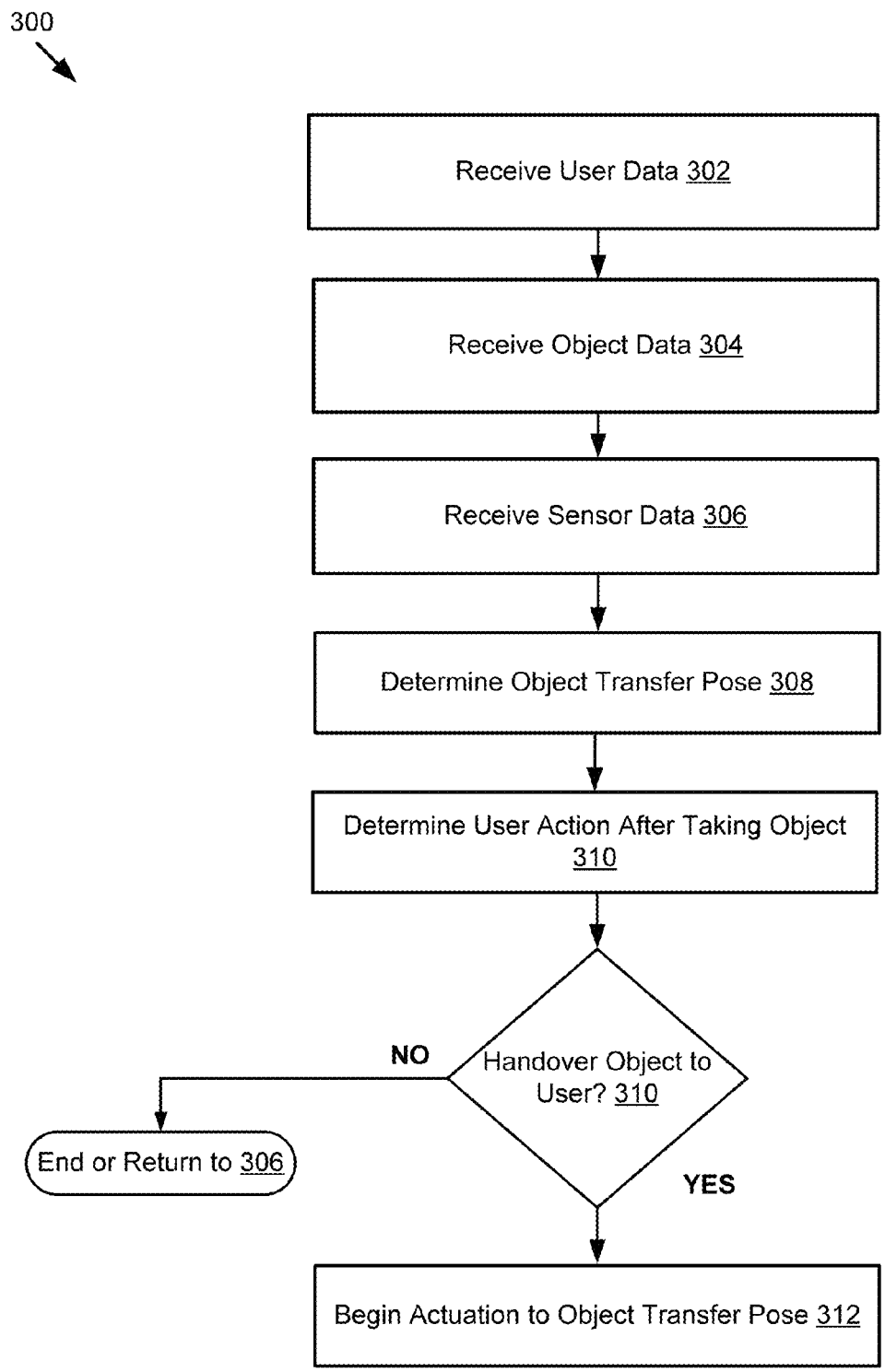
FIG. 3 is a flowchart of an example method for determining an object transfer pose.

Referring now to FIG. 3, an example of a method 300 for determining an object transfer pose 308 for handover of an object 188 to a user 110 is described. In one embodiment, the zone system 197, the pose system 199 or a combination of the zone system 197 and the pose system 199 may be a processor-based computing device programmed to perform one of more steps of the method 300.

User data 192 is received at step 302. Object data 194 is received at step 306. Sensor data 249 is received at step 306. An object transfer pose for handover of the object 188 to the user 101 at step 308. A user action after taking the object 188 is determined at step 310. A decision is made at step 311 as to whether to handover the object 188 to the user 101. For example, one or more assessment criteria may be determined and a decision made to not handover the object 188 to the user 101 based on the assessment criteria indicating risk to the user 101.

If the decision at step 311 is to not handover the object 188 to the user 101, then the method 300 ends or returns to another step of the method. For example, the method 300 proceeds to step 306.

If the decision at step 311 is to handover the object 188 to the user 101, then the method 300 proceeds to step 312. The robot 190 determines how to actuate based on the object transfer pose. The robot 190 begins actuation to form the object transfer pose at step 312. The user 101 may receive the object 188 from the robot 190. The robot 190 may continue assessing the risk to the user 101, determine actuations to lessen the risk to the user 190 and respond in order to lessen the risk to the user 190.

Figure 4:
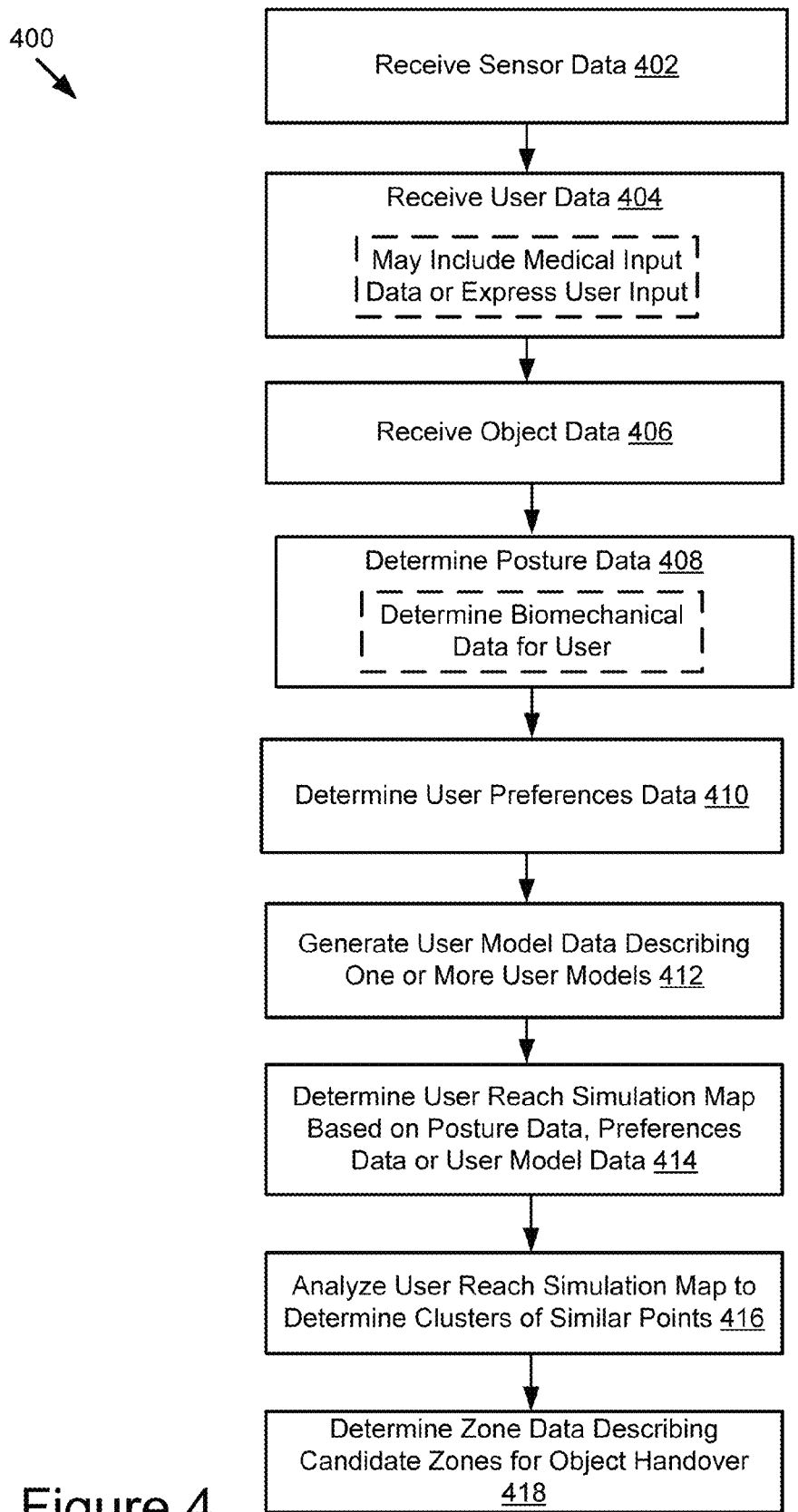
FIG. 4 is a flowchart of an example method for determining candidate zones for object handover.

Referring now to FIG. 4, an example method 400 for determining zone data 276 is depicted. In one embodiment, the zone system 197, the pose system 199 or a combination of the zone system 197 and the pose system 199 may be a processor-based computing device programmed to perform one of more steps of the method 400. For example, the zone system 197 is programmed to perform one or more steps of the method 400. The zone system 197 may be a special purpose computer programmed to perform one or more steps of the method 400. Sensor data 249 is received at step 402.

User data 194 is received at step 404. The user data 194 may include medical input data 273 or an express input from the user 101. The express input from the user 101 may expressly describe one or more preferences of the user 101. Object data 196 is received at step 405. Posture data 271 is determined at step 408. Step 408 may include determining biomechanical data for the user 101. The biomechanical data for the user may be an element of the posture data 271. User preferences data 272 is determined at step 410. User model data 274 describing one or more user models is generated at step 412. One or more user reach simulation maps describing one or more user models is generated at step 414. The user reach simulation maps may be described by reach simulation data 275. The one or more user reach simulation maps are analyzed to determine clusters of similar points at step 416. The analysis of step 416 may be an iterative analysis. Zone data 276 describing candidate zones for object handover are determined at step 418. The candidate zones described by the zone data 276 may be ranked. For example, a ranked list of one or more candidate zones may be described by the zone data 276.

Figure 5:
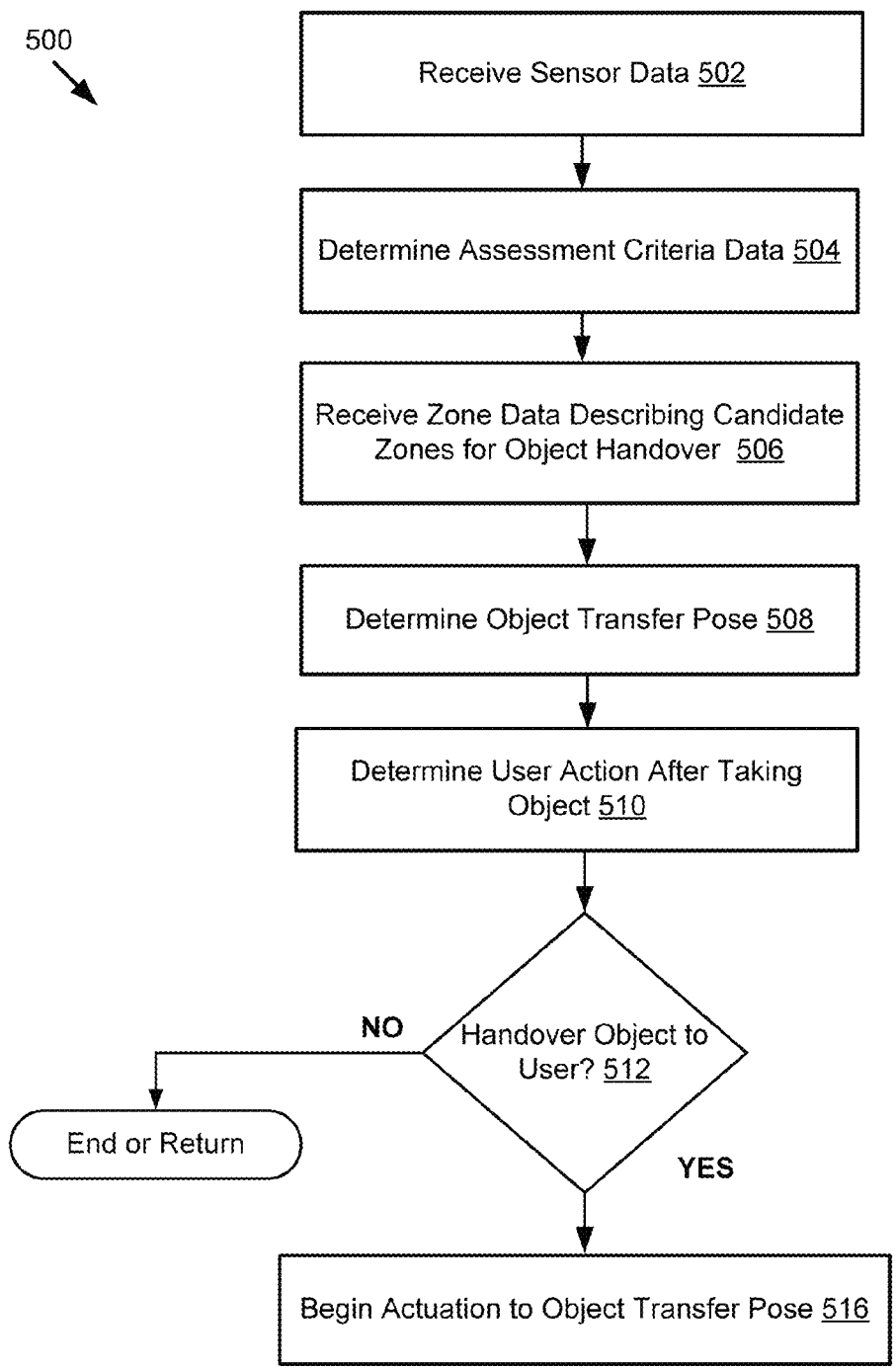
FIG. 5 is a flowchart of an example method for determining an object transfer pose.

Referring now to FIG. 5, an example method 500 for determining an object transfer pose is described. Sensor data 249 is received at step 502. Assessment criteria data 261 is determined at step 504. The assessment criteria data 261 may be determined based on the sensor data 249. The zone data 276 may be received at step 506. The object transfer pose may be determined at step 508. The object transfer pose may be determined by filtering the candidate zones described by the zone data 276 based on the assessment criteria data 261. In this way, the list of candidate zones may be updated based on currently observed conditions. The action of the user 110 after taking the object 188 is determined at step 510.

A determination is made as to whether to handover the object 188 to the user 101 at step 512. For example, the assessment criteria data 261 may indicate conditions that make it unsafe or too risky to handover the object to the user 101. In one embodiment, the pose system 199 is programmed with a risk threshold. The assessment module 268 may analyze the assessment criteria data 261 and determined if the threshold is exceeded. If the threshold is exceeded, the method 500 may return to step 508 where the assessment module 268 may select a different object transfer pose determined to be less risky. The method may cycle through in this manner a predetermined number of times attempting to identify an acceptable object transfer pose. If an acceptable object transfer pose is not identified, then the method 500 may end or the second communication unit 283 may ask for new instructions from the user 101 or the medical input provider 170. Alternatively, if no acceptable object transfer pose is identified after a predetermined number of attempts the pose system 199 may analyze the sensor data 249 to identify a flat or approximately flat surface in the user environment 198 and then determine actuations and movement vectors for the robot 190 to take to traverse to that surface and place the object 188 on the surface for the user 101 to pick up for themselves.

If the decision at step 512 is to handover the object 188 to the user 101, then the method 500 proceeds to step 516 and the robot 190 begins actuations or movements to assume the object transfer pose 516.

Example User Models

Figure 6A:
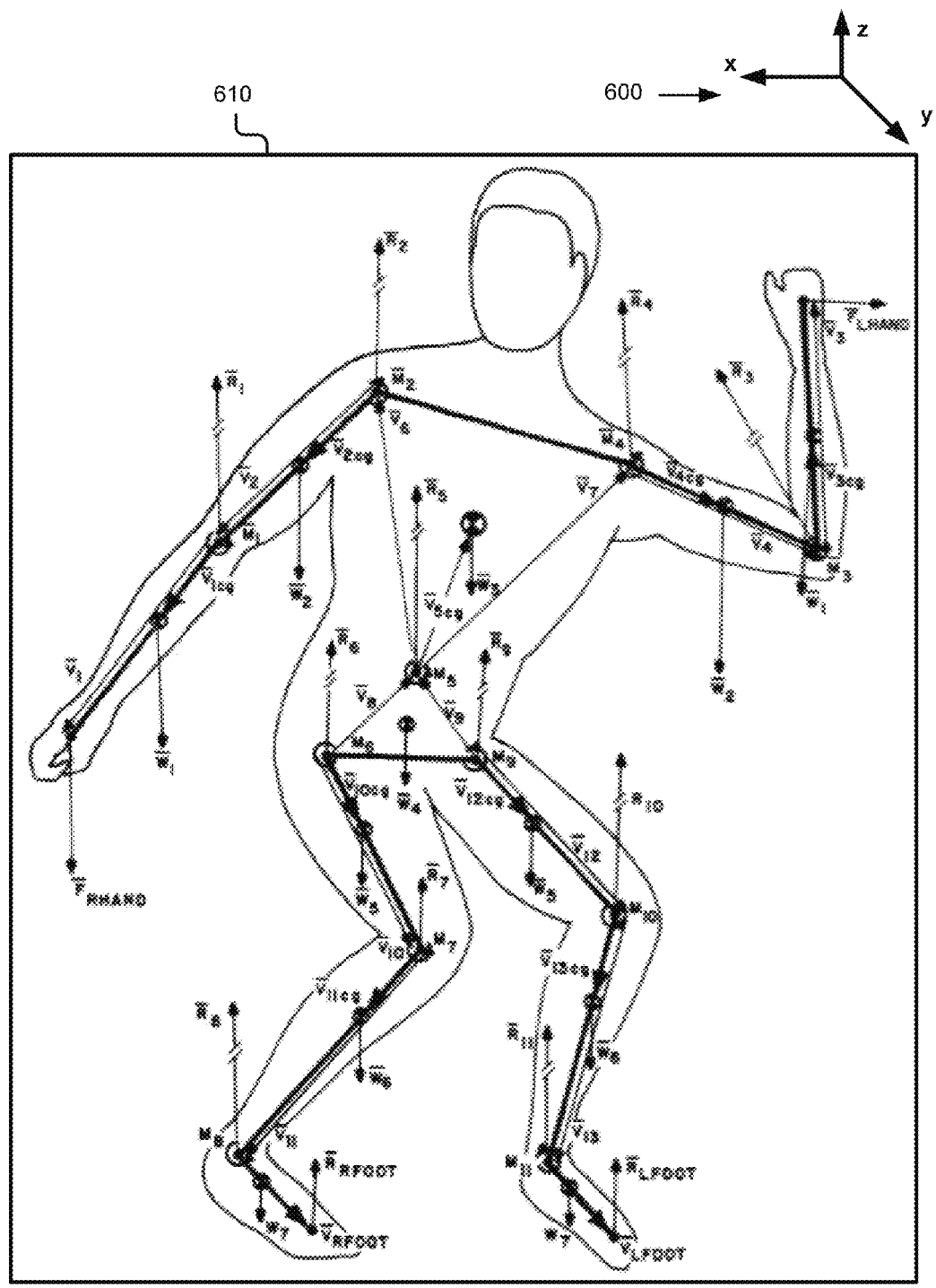
FIGS. 6A and 6B are graphical illustrations of example user models.

Referring now to FIG. 6A, an example biomechanical model 610 for the user 101 is depicted. Element 600 is a Cartesian (X, Y, Z) coordinate key for the biomechanical model 610. The biomechanical model 610 may include a static distribution of the moment and force vectors at each joint of the user 101. The biomechanical model 610 may also include user data 192 for the user 101 associated with the biomechanical model 610. For example, the biomechanical model may indicate the weight and height of the user 101.

Figure 6B:
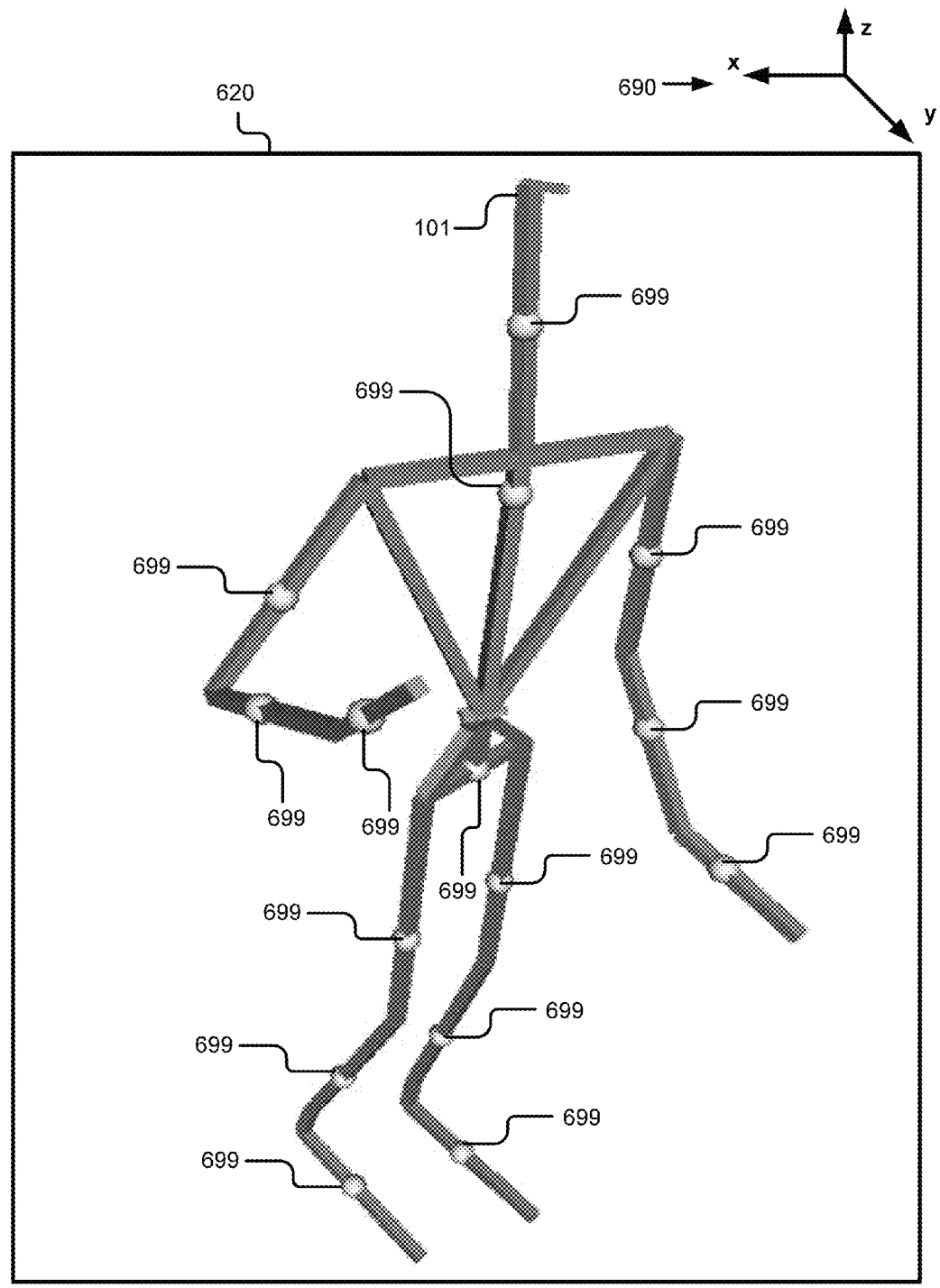

Referring now to FIG. 6B, an example link model 620 for the user 101 is depicted. Element 690 is a Cartesian (X, Y, Z) coordinate key for the biomechanical model 610. Elements 699 may be centers of gravity for each link in the link model 620. In one embodiment, each link of the link model 620 is the area of the user 101 between each joint of the user 101. For example, a femur of the user 101 may be a link of the model 620 because it is located between the knee and the hip of the user 101.

In one embodiment, the link model 620 may be determined by the model module 208 of the zone system 197 based at least in part on the user data 192 and the biomechanical data for the user 101. For example, the link model 620 is determined by the model module 208 based on one or more of the following: the length and mass proportions of each link with reference to height and weight of the user 101; the center of mass offset for each link with reference to the height of the user 101; or the range of motion around each axis for each joint of the user 101. In one embodiment, the user model data 274 describing the link model 620 is used by the simulation module 210 to determine: (1) reach simulation data 275 describing moments around X, Y and Z-axes starting from the mass of the object 188 in hand for the user 101 (if any); (2) the load on the joints of the user 101 from the wrists of the user 101 to the L5S1 vertebra; and (3) the load on the joints of the user 101 from the ankles of the user 101 to the L5S1 vertebra.

In one embodiment, the load distribution for the hands of the user 101 is determined by the model module 208 based on how the user 101 holds the object 188. The load distribution for the feet of the user 101 may be determined by the model module 208 based in part on whether the user 101 has both of their feet on the ground or not. These factors in determining the link model 620 may be indicated by any combination of the user data 192, the posture data 271 or the user preferences data 272.

Example Reach Simulations

Referring now to FIG. 7A, depicted is an example user reach scenario 700 that is used to create the example reach simulations 790, 791, 792, 793 described below with reference to FIGS. 7B-7E. In this scenario 700, a user 720 is reaching for an object 730 on a table 710. For FIGS. 7B-7E, different users 720 attempt this scenario by sitting at the table 710 and reaching for the object 730. As will be shown in FIGS. 7B-7E, there is a different in moments experienced by different users 720 when reaching for the same position using their right arm. The difference in the moment for the different users 720 is due to differences in their height, weight, and other biomechanical data for the users 720 that may be indicated by their user data 192.

Referring now to FIGS. 7B-7E, depicted is example user reach simulations 790, 791, 792, 793 for a first user 720A and a second user 720B who are different from each other. These user reach simulations 790, 791, 792, 793 indicate that the different users 720A, 720B experience different moments about their joints when reaching in accordance with the same user reach scenario 700 depicted in FIG. 7A. The user reach simulations 790, 791, 792, 793 may correspond to a user 720A, 720B reaching to a point in a user environment. The user reach simulations 790, 791, 792, 793 may be based on simulating the user 720A, 720B reaching to one or more points in the user environment. For example, the user reach simulations 790, 791, 792, 793 are based on simulating the user 720A, 720B reaching for every point in the user environment. Generating the user reach simulations 790, 791, 792, 793 or the candidate zones may include analyzing the reach simulations to assign a value to each three-dimensional point in the user environment or six-dimensional point in the user environment. Each value may be based on one or more of the following: (1) the moments or forces applied to the joints of the user 720A, 720B when reaching to a particular point in the user environment; and (2) whether the point, moments or forces is consistent with the user preferences for receiving the object from a robot.

In one embodiment, the values may be determined by the simulation module 210 or the candidate zone module 214 based at least in part on the user preferences data 272 and the reach simulation data 275 which includes data describing the moments or forces applied to one or more of the user joints when reaching for the three-dimensional or six-dimensional point in space corresponding to the user reach simulation 790, 791, 792, 793. In this way, the zone system 197 may consider every point in the user environment and determine a zone of points that minimize the moments or forces applied to the joints of the user while also being consistent with the preferences of the user.

Figure 8:
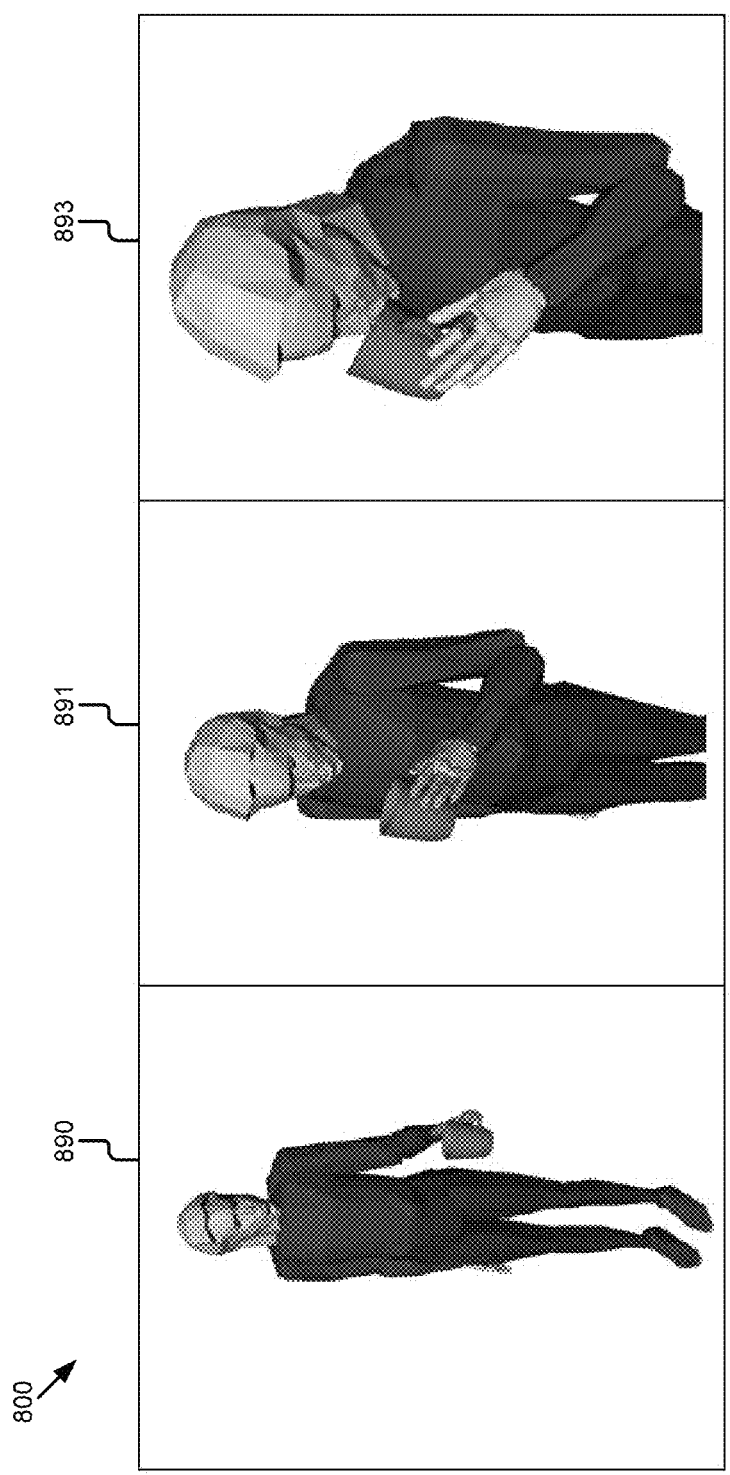
FIG. 8 is a graphical illustration of an example three-dimensional subsequent action simulation.

Referring now to FIG. 8, depicted are three-dimensional examples 800 of user next action simulations 890, 891, 893. Simulations 890, 891, 893 depict different example poses for a user after receiving an object from a robot. Simulation 890 depicts an example pose for a user after receiving an object from a robot whose object handover pose is based on a kinematic model. The handover pose is considered by medical input providers to be undesirable because of the moments that result to the joints of the user. Simulation 891 depicts an example pose for a user after receiving an object from a robot whose object handover pose is determined in accordance with the methods 300, 400, 500 and techniques described above. For example, the pose of the robot is based in part on a biomechanical model for this specific user including input describing the preferences of the user and input provided by a medical input provider. The pose depicted in simulation 891 is considered to be desirable by medical input providers as it results in a more comfortable, convenient handover pose for the user since, for example, the pose system of the robot knows that the user intends to drink from the cup after the handover event. Simulation 893 depicts the user drinking from the cup a moment in time after the moment depicted in pose 891.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments, or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   determining, by a processor, posture data for a user based on observation of the user, the posture data describing the posture of a body of the user when reaching for one or more locations;
   generating user model data describing one or more user models based on the posture data and user data describing a height and a weight for the body of the user;
   determining user preferences data describing the preferences of the user for receiving an object including a pose of a robot;
   generating two or more reach simulations that simulate the user reaching for different points inside a user environment to receive the object, each reach simulation resulting in a hand of the user arriving at a three-dimensional point in the user environment and moments being applied to one or more joints of the user;
   analyzing the reach simulations to assign a value to each three-dimensional point in the user environment, each value being based on the moments applied to the one or more joints of the user when reaching to that three-dimensional point and whether the three-dimensional point is consistent with the user preferences for receiving the object;
   grouping the three-dimensional points into one or more clusters of similar points to form candidate zones including one or more points inside the user environment where the robot can place the object for handover to the user; and
   ranking the candidate zones based on the values and storing the ranked candidate zones as zone data.

2. The method of claim 1, wherein the posture data is determined based on observation of the user by one or more sensors.

3. The method of claim 1, wherein the one or more user models includes one or more of a biomechanical model and a link model.

4. The method of claim 3, wherein the one or more models are specific to the user.

5. The method of claim 1, wherein the preferences of the user are based on explicit input provided by the user.

6. The method of claim 1, where in the preferences of the user are based on observation of the user by one or more sensors.

7. The method of claim 1, wherein the preferences of the user are based on observation of the user by one or more medial input providers.

8. The method of claim 1, wherein the method simulates the user reaching for every three-dimensional point inside the user environment to receive the object.

9. A method comprising:

determining assessment criteria data based on sensor data;

filtering, by a processor, a list of candidate zones based on the assessment criteria data and a user preference to determine an object transfer pose describing how a robot is oriented for handover of an object to a user, the candidate zones including one or more points inside a user environment where the robot can place the object for handover to the user and the user preference including the user's preference for the object transfer pose;

determining a user action after taking the object from the robot;

determining whether to handover the object to the user based on the user action; and responsive to determining to handover the object to the user, begin actuation of the robot to handover the object to the user based on the object transfer pose.

10. The method of claim 9, wherein the sensor data describes one or more current conditions present in the user environment based on observation of the user environment by one or more sensors.

11. The method of claim 9, wherein the assessment criteria describe one or more conditions of the user, robot, object or user environment that may affect how or whether the robot begins actuation to handover the object to the user.

12. The method of claim 9, wherein the determination of the user action after taking the object from the robot is based on explicit input from the user describing their intended actions after taking the object from the robot.

13. The method of claim 9, wherein the determination of whether to handover the object to the user is based on the assessment criteria data describing one or more conditions of the user, robot, object or user environment relevant to whether the robot should handover the object to the user.

14. The method of claim 9, wherein responsive to determining not to handover the object to the user, the method identifies a surface in the user environment that and begins actuation of the robot to place the object on the surface for the user.

15. A system comprising:

a processor; and a tangible, non-transitory memory storing instructions that, when executed, cause the system to:

determine assessment criteria data based on sensor data;

filter a list of candidate zones based on the assessment criteria data to determine an object transfer pose describing how a robot is oriented for handover of an object to a user, the candidate zones including one or more points inside a user environment where the robot can place the object for handover to the user;

determine a user action after taking the object from the robot based at least in part on an explicit input describing one or more motions of the user after taking the object from the robot;

determine whether to handover the object to the user based on the user action; and responsive to determining to handover the object to the user, begin actuation of the robot to handover the object to the user based on the object transfer pose.

16. The system of claim 15, wherein the sensor data describes one or more current conditions present in the user environment based on observation of the user environment by one or more sensors.

17. The system of claim 15, wherein the assessment criteria describe one or more conditions of the user, robot, object or user environment that may affect how or whether the robot begins actuation to handover the object to the user.

18. The system of claim 15, wherein the explicit input is received from the user and describes one or more intended actions of the user after taking the object from the robot.

19. The system of claim 15, wherein the determination of whether to handover the object to the user is based on the assessment criteria data describing one or more conditions of the user, robot, object or user environment relevant to whether the robot should handover the object to the user.

20. The system of claim 15, wherein responsive to determining not to handover the object to the user, the system identifies a surface in the user environment that and begins actuation of the robot to place the object on the surface for the user.

* * * * *